(12) United States Patent
Waldron et al.

(10) Patent No.: US 11,092,821 B1
(45) Date of Patent: *Aug. 17, 2021

(54) APPARATUS AND METHOD FOR PROJECTING THREE-DIMENSIONAL HOLOGRAPHIC IMAGES

(71) Applicants: Mary Gormley Waldron, Huntington, NY (US); Kenneth Epstein, Baldwin, NY (US)

(72) Inventors: Mary Gormley Waldron, Huntington, NY (US); Kenneth Epstein, Baldwin, NY (US)

(*) Notice: Subject to any disclaimer, the term of this patent is extended or adjusted under 35 U.S.C. 154(b) by 105 days.

This patent is subject to a terminal disclaimer.

(21) Appl. No.: 16/194,950

(22) Filed: Nov. 19, 2018

Related U.S. Application Data

(63) Continuation-in-part of application No. 15/644,156, filed on Jul. 7, 2017, now Pat. No. 10,310,284.

(Continued)

(51) Int. Cl.
  *G03B 21/28* (2006.01)
  *H04N 13/322* (2018.01)
  (Continued)

(52) U.S. Cl.
  CPC ......... *G02B 30/56* (2020.01); *G03B 21/2033* (2013.01); *G03B 21/28* (2013.01); *H04N 13/388* (2018.05); *G03B 21/16* (2013.01)

(58) Field of Classification Search
  CPC .... G02B 30/56; G03B 21/28; G03B 21/2033; G03B 21/16; H04N 13/388
  See application file for complete search history.

(56) References Cited

U.S. PATENT DOCUMENTS

| | | | | |
|---|---|---|---|---|
| 5,506,595 A | * | 4/1996 | Fukano | B60K 35/00 345/7 |
| 5,944,403 A | * | 8/1999 | Krause | G02B 30/56 353/74 |

(Continued)

OTHER PUBLICATIONS

Beam splitter, Wikipedia (Accessed Jul. 6, 2017) https://en.wikipedia.org/wiki/Beam_splitter.

(Continued)

*Primary Examiner* — Mulugeta Mengesha
*Assistant Examiner* — Alazar Tilahun
(74) *Attorney, Agent, or Firm* — Amster, Rothstein & Ebenstein LLP

(57) ABSTRACT

A projection apparatus projects holographic images. The projection apparatus includes, within a housing, a laser projection system that outputs a laser beam, a diffuser to diffuse the laser beam projected by the laser projection system, a beam diverter/splitter that polarizes the received beam after it has been diffused by the diffuser, and a concave mirror onto which the beam is diverted and which reflects the images to the floating display position that is outside the housing. The apparatus may further include an adjustable lens to adjust the focus and/or size of images that are reflected from the concave mirror. Multiple projection apparatuses may be mounted around the floating display position to synchronously project the holographic images. A conical mirror may be used with the projection apparatus or with multiple projection apparatuses to display the images at a position above the conical mirror.

20 Claims, 16 Drawing Sheets

Related U.S. Application Data

(60) Provisional application No. 62/593,567, filed on Dec. 1, 2017, provisional application No. 62/508,063, filed on May 18, 2017, provisional application No. 62/360,364, filed on Jul. 9, 2016.

(51) Int. Cl.
  *G02B 30/56* (2020.01)
  *G03B 21/20* (2006.01)
  *H04N 13/388* (2018.01)
  *G03B 21/16* (2006.01)

(56) References Cited

U.S. PATENT DOCUMENTS

| | | | | |
|---|---|---|---|---|
| 8,279,268 | B2 | 10/2012 | Vrachan et al. | |
| 2006/0152784 | A1* | 7/2006 | Usami | G02B 30/56 359/28 |
| 2006/0171008 | A1* | 8/2006 | Mintz | G02B 30/54 359/15 |
| 2011/0261427 | A1* | 10/2011 | Hart | G03H 1/26 359/22 |
| 2014/0111479 | A1 | 4/2014 | Krah | |
| 2018/0239152 | A1 | 8/2018 | Kuo | |

OTHER PUBLICATIONS

Homemade CRT, posted Dec. 12, 2011; https://www.bing.com/videos/search?q=video+of+how+a+crt+create+an+image&&view=detail&mid=C0A0FAC8FD2D10108F67C0A0FAC8FD2D101018F67&rvsmid=48D411474AF5DAA2BA22F48D411474AF5DAA2BA2F&fsscr=0&FORM=VDQVAP.

How to Make a Laser Light Show Projector posted Feb. 2, 2017, https://www.bing.com/videos/search?q=video+of+how+a+laser+projector+create+an+image&&view=detail&mid=39F060AC365D8FC5096039F060AC365D8FC50960&FORM=VRDGAR.

Home made laser projector useing Raspberry PI, posted Oct. 26, 2016, https://www.bing.com/videos/search?q=home+made+laser+projector+useing+Respberry+PI&& view=detail&mid=E947D1FC48449E5A451CE947D1FC48449E5A451C&FORM=VRDGAR.

3D Hologram Demonstration, Published Apr. 21, 2010, www.youtube.com, https://www.youtube.com/watch?v=G10bzatpuFc.

Cone Mirrors, Edmund Optics, Accessed Sep. 25, 2017, https://www.edmundoptics.com/optics/optical-mirrors/specialty-mirrors/cone-mirrors.

Anti-Glare vs. Anti-Reflective Glass, (Accessed Jun. 14, 2017) http://abrisatechnologies.com/2014/11/anti-glare-vs-anti-reflective-glass/.

Holography, Wikipedia.org, (accessed Jun. 23, 2017) https://en.wikipedia.org/wiki/Holography.

Acrylic Mirror Cutting, Routing, Bending & More, Fabrication Guide (Accessed Jul. 6, 2017) http://www.plaskolite.com/Fabrication/Mirror/Care (2 pages).

Acrylic Sheet Education, Specs & Inspiration, Plaskolite (Accessed Jul. 6, 2017) http://www.plaskolite.com/ (1 page).

Christie RGB laser projection, Christie Digital Systems USA, Inc. (2016), 4 pages.

Curved mirror, Wikipedia (Accessed Jul. 6, 2017) https://en.wikipedia.org/wiki/Curved_mirror.

Laser projector, Wikipedia (Accessed Jul. 6, 2017) https://en.wikipedia.org/wiki/Laser_projector.

Ultrasonic transducer, Wikipedia (Accessed Jul. 6, 2017) https://en.wikipedia.org/wiki/Ultrasonic_transducer.

\* cited by examiner

APPARATUS AND METHOD FOR PROJECTING THREE-DIMENSIONAL HOLOGRAPHIC IMAGES

CROSS-REFERENCE TO RELATED APPLICATIONS

The present application claims priority to and the benefit of U.S. Provisional Patent Application No. 62/593,567, filed Dec. 1, 2017, and is a continuation-in-part of and claims priority to and the benefit of U.S. patent application Ser. No. 15/644,156, filed Jul. 7, 2017, which claims priority to and the benefit of U.S. Provisional Patent Application No. 62/508,063, filed May 18, 2017 and U.S. Provisional Patent Application No. 62/360,364, filed Jul. 9, 2016, the entire contents of each of these applications being incorporated herein by reference as if fully set forth herein.

FIELD

The present invention relates to an improved apparatus and method for projecting three-dimensional holographic images using an apparatus that includes a diffuser.

BACKGROUND

U.S. Pat. No. 8,279,268 to Vrachan et al. discloses a prior art projection system for aerial display of three-dimensional video images. FIG. 2 of the Vrachan patent, reproduced herein as FIG. 1, shows a system for projecting three-dimensional video images where a high-bright liquid crystal display device 122 projects an image outward to an observer. A shortcoming of that technology is that when one wants to scale up the projected image to a larger size, larger components are required, including a larger liquid crystal display, a larger beam splitter, and a larger concave mirror, which increases the size of the projection system. In addition, the larger display adds weight to the projection system, and larger components are generally more expensive. Further, the light that is projected is not especially bright. Moreover, a viewer will not be able to view the projected image from all angles around the object in Vrachan because of the limitations of the optical characteristics of the described projection system, which project the image for viewing over a narrow relatively narrow angle such as at an angle of about 60 degrees or less around the projected object.

SUMMARY

The present invention creates three-dimensional holographic images that appear as floating images (also known as aerial images) to be projected by a projection apparatus (device) for display as floating images at a position (floating display position) located outside of the projection apparatus. The projected images give the appearance of depth with the proper colors and a 3D image, either live, canned, or animation to be projected. The image is holographically projected so it appears in 3D without glasses.

Another embodiment of the invention uses multiple devices arranged to surround a floating display position, such as in a circular or other polygonal pattern, so images projected from the multiple devices overlap to produce true holographic images that are viewable without glasses.

Another embodiment of the invention uses a single device or multiple devices arranged to surround a floating display position, such as in a circular or other polygonal pattern, pointing down to a conical mirror which projects the images outward for a full 360° degree experience.

In accordance with an embodiment of the present invention, a projection apparatus for projecting three-dimensional holographic images to a floating display position is described. The projection apparatus includes a housing that has a laser projection system that is configured to project video images using a laser beam. The laser projection system includes (i) one or more video inputs for inputting image data for the three-dimensional holographic images; (ii) a video processor for generating the video images corresponding to the image data input via the one or more video inputs; and (iii) a laser output operatively connected to the video processor and configured to output the laser beam comprising the video images corresponding to the input image data. The housing further includes a diffuser to diffuse the laser beam that is output from the laser projection system, a beam diverter placed to receive the laser beam that is directed by the laser projection system after it is diffused by the diffuser; a concave mirror placed to receive the laser beam reflected by the beam diverter and to reflect the laser beam back through the beam diverter to project three-dimensional holographic images to a focal point at the floating display position that is spaced at a distance from the outside of the housing.

In embodiments, the projection apparatus further includes a lens or series of lenses placed inside of, and spaced away from, a wall of the housing, through which the laser beam that is reflected from the concave mirror is directed and passes and to the floating display position that is located outside of the housing; and an adjuster for the lens or series of lenses that is configured to adjust the distance between the lens or series of lenses and the floating display position to which the three-dimensional holographic images are projected for display and/or to adjust the size of the three-dimensional holographic images displayed at the floating display position. In embodiments, the lens or one of the series of lenses includes at least one Fresnel lens. Also, in embodiments, an anti-reflective glass is mounted outside of the housing, and the three-dimensional holographic images are projected through the anti-reflective glass to reduce image brightness outside of the housing. Moreover, in embodiments, a position of the concave mirror within the housing is adjustable remotely to adjust the floating display position or size of the projected three-dimensional holographic images.

In embodiments, the concave mirror may be made of multiple mirror segments. In embodiments, the concave mirror may comprise a flexible mirror surface that is applied to a membrane, and the projection apparatus further includes a vacuum subsystem or a mechanical subsystem that is activatable to adjust the concave curvature of the mirror. In embodiments, the concave mirror may be spherical or may be parabolic.

In embodiments, a rotating mirror 220 is used in lieu of a beam diverter/splitter 203 to paint an image directly onto the concave mirror.

In embodiments, a projection apparatus projects to a floating display position three-dimensional holographic images that are viewable from multiple angles surrounding the three-dimensional holographic images by positioning at least three projection subsystems spaced from one another surrounding the floating display position. At least one of the projection subsystems includes a housing that includes (1) a laser projection system that is configured to project first video images using a first laser beam, and includes (i) a first set of one or more video inputs for inputting first image data for the three-dimensional holographic images; (ii) a video processor for generating the first video images corresponding to the first image data input via the first set of one or more video inputs; and (iii) at least one laser output operatively connected to the video processor and configured to output the first laser beam comprising the first video images corresponding to the first input image data. The housing further includes (2) a first diffuser to diffuse the first laser beam that is output from the laser projection system; (3) a first beam diverter placed to receive the first laser beam that is directed by the first laser projection system after it is diffused by the diffuser; and (4) a first concave mirror placed to receive the first laser beam reflected by the first beam diverter and to reflect the first laser beam back through the first beam diverter. In embodiments, the at least one of the projection subsystems may also include (5) a first lens or a series of lenses, placed inside of, and spaced away from a first wall of, the first housing, through which the first laser beam that is reflected from the first concave mirror is directed and passes to project three-dimensional holographic images to a focal point at the floating display position that is spaced at a first distance from the first lens or series of lenses and that is located outside of the first housing; and may include (6) a first adjuster for the first lens or series of lenses that is configured to adjust the first distance between the first lens or series of lenses and the floating display position to which the three-dimensional holographic images are projected for display and/or to adjust the size of the three-dimensional holographic images displayed at the floating display position. The projection apparatus with multiple subsystems may further include one or more mounts to mount each of the at least three projection subsystems at a different angular position around the floating display position. In this embodiment, each of the respective projection subsystems is operable to synchronously project the three-dimensional holographic images by the at least three projection subsystems to the floating display position from a perspective that is dependent on the respective angular position of each of the at least three projection subsystems such that the three-dimensional holographic images projected by the at least three projection subsystems overlap at the floating display position and are viewable from multiple positions surrounding the floating display position. In embodiments, the at least three projection subsystems are spaced around the floating display position and are spaced apart from one another at an angle of approximately 360/x where x equals the number of projection subsystems in the projection apparatus.

In accordance with another embodiment of the present invention, a projection apparatus is described for projecting to a floating display position three-dimensional holographic images that are viewable from multiple angles surrounding the three-dimensional holographic images by positioning at least three projection subsystems spaced from one another surrounding the floating display position. At least one of the three projection subsystems includes a housing that includes (1) a laser projection system that is configured to project first video images using a first laser beam, and includes (i) a first set of one or more video inputs for inputting first image data for the three-dimensional holographic images; (ii) a video processor for generating the first video images corresponding to the first image data input via the one or more video inputs; and (iii) at least one laser output operatively connected to the video processor and configured to output the first laser beam comprising the first video images corresponding to the first input image data. The housing further includes (2) a first diffuser to diffuse the first laser beam that is output from the laser projection system; (3) a first beam diverter placed to receive the first laser beam that is directed by the first laser projection system after it is diffused by the diffuser; and (4) a first concave mirror placed to receive the first laser beam reflected by the first beam diverter and to reflect the first laser beam back through the first beam diverter. In embodiments, the at least one of the projection subsystems also includes (5) a first lens or a series of lenses, placed inside of, and spaced away from a first wall of, the first housing, through which the first laser beam that is reflected from the first concave mirror is directed and passes to project three-dimensional holographic images to a focal point at the floating display position that is spaced at a first distance from the first lens or series of lenses and that is located outside of the first housing; and (6) a first adjuster for the first lens or series of lenses that is configured to adjust the first distance between the first lens or series of lenses and the floating display position to which the three-dimensional holographic images are projected for display and/or to adjust the size of the three-dimensional holographic images displayed at the floating display position. The projection apparatus further includes one or more mounts to mount each of the first, second, and third-projection subsystems at a different angular position around the floating display position; and a conical mirror positioned below the at least three projection subsystems to receive the respective three-dimensional holographic images projected downward by each of the respective lenses or series of lenses and to reflect the three-dimensional holographic images upward to the floating display position located above the conical mirror to be viewable from multiple positions surrounding the floating display position. In this embodiment, each of the respective projection apparatus subsystems is operable to synchronously project the three-dimensional holographic images by the at least three projection subsystems to the floating display position from a perspective that is dependent on the respective angular position of each of the at least three projection subsystems such that the three-dimensional holographic images projected by the at least three projection subsystems overlap at the floating display position and are viewable from multiple positions surrounding the floating display position and are viewable from multiple positions surrounding the floating display position. In embodiments, the at least three projection subsystems are spaced around the floating display position and are spaced apart from one another at an angle of approximately 360/x where x equals the number of projection subsystems in the projection system.

In embodiments, the concave mirror may be made of multiple mirror segments. In embodiments, the concave mirror may comprise a flexible mirror surface that is applied to a membrane, and the projection apparatus further includes a vacuum subsystem or a mechanical subsystem that is activatable to adjust the concave curvature of the mirror.

In embodiments, the diffuser is comprised of a translucent material and may be located at a first position such that the laser beam from the laser projection system passes through the diffuser before being received at the beam diverter. In alternative embodiments, the diffuser is comprised of a reflective material and may be located at a second position such that the laser beam that is output from the laser projection system is reflected by the diffuser back toward the beam diverter.

BRIEF DESCRIPTION OF THE DRAWINGS

Exemplary embodiments of the present invention will be described with references to the accompanying figures, wherein.

DETAILED DESCRIPTION OF THE INVENTION

The present invention generally relates to a projection apparatus for the generation of three-dimensional holographic images projected to a floating display position where the images are projected using a laser projection system. In embodiments, the projection apparatus projects three-dimensional holographic images that are displayed at the floating display position for viewing by a viewer from a limited viewing angle such as in a 60 degree arc around the floating display position. In alternative embodiments, the projection apparatus includes multiple projection subsystems that are synchronously controlled and operated to each project the same three-dimensional images such that the images from each of the multiple projection subsystems overlap at the floating display position such that the projected objects may be viewed from any angle around the floating display position. Where there are multiple projection subsystems, the projection subsystems may be connected as a network connection to be controlled by a computer (not shown).

Figure 1:
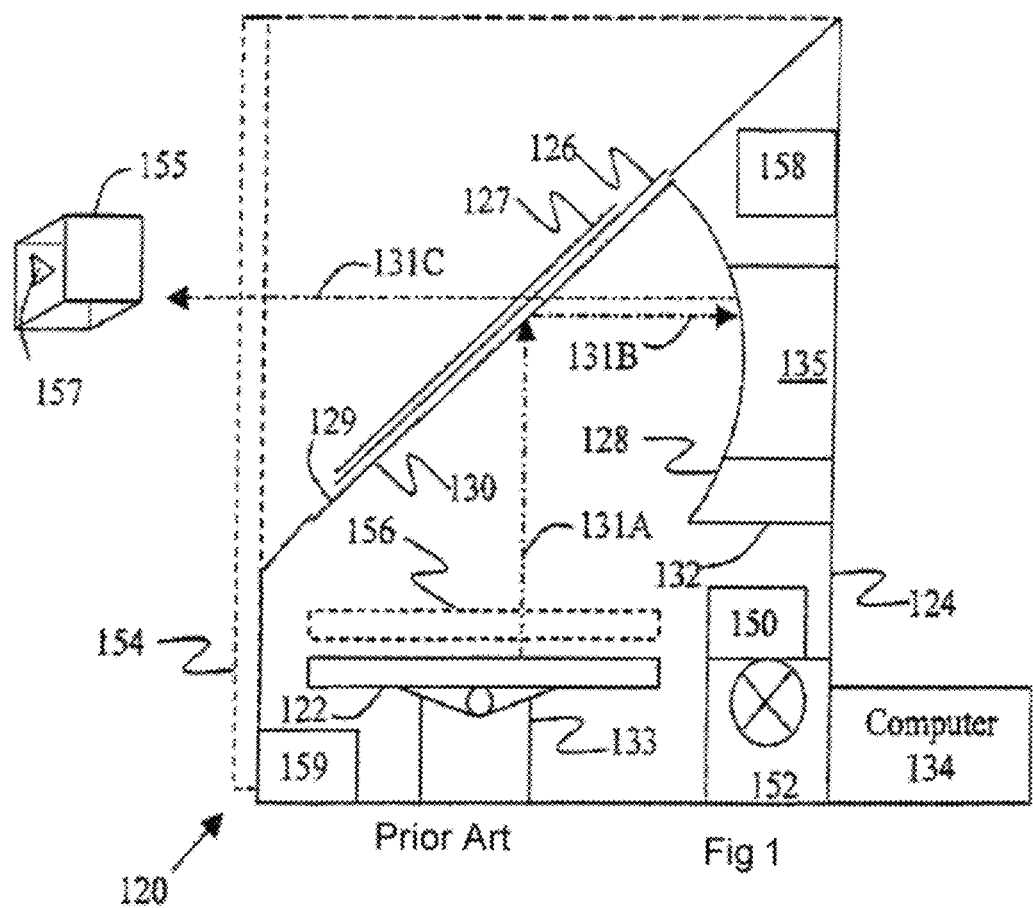
FIG. 1 illustrates a prior art aerial display system for projecting three-dimensional video images.
Figure 2:
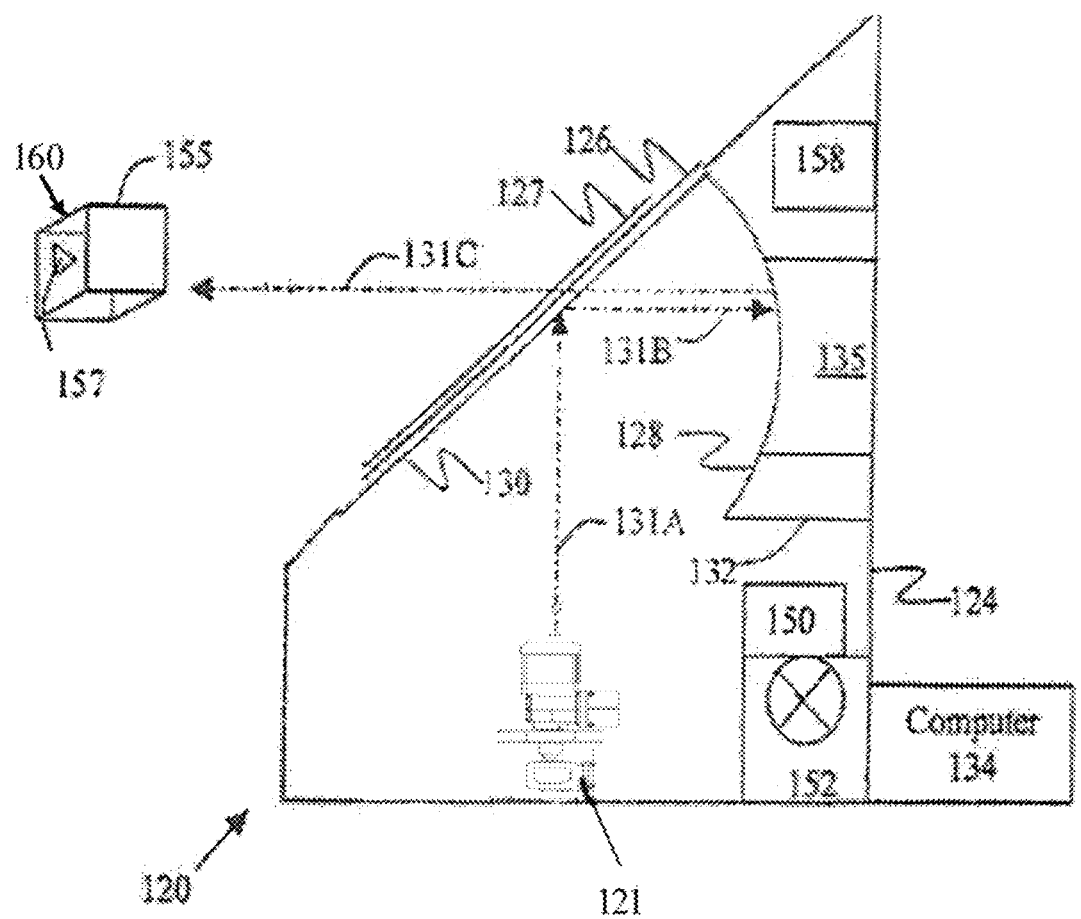
FIG. 2 illustrates a projection apparatus for displaying three-dimensional holographic images in accordance with an embodiment of the present invention.

FIG. 2 illustrates a sectional side view of one projection apparatus (aerial display system/display device) 120 in accordance with an embodiment of the present invention that uses laser light to create a three-dimensional (3D) image having 3D depth, either live, canned, or animation, to be projected through a screen attached to the outside of a housing of the projection apparatus. The image is holographically projected so it appears at the floating display position outside of the projection apparatus in full depth 3D for viewing without glasses.

In the embodiment of FIG. 2, projection apparatus 120 includes a housing 124 that provides an enclosure and the support frame for maintaining optical elements in a fixed orientation relative to the laser projection system 121. The optical elements comprise a polarizer 126, a concave mirror 128, which, in embodiments, is made, for example, of plastic or glass, and a beam diverter or beam splitter 130 positioned between concave mirror 128 and the polarizer 126. Polarizer 126, concave mirror 128, and beam diverter or splitter 130 are optically aligned in a first portion of the housing 124 so that the image formed on the laser projection system 121 is projected outward toward an observer/viewer as indicated by dashed arrows 131A, 131B and 131C. As illustrated, a floating 3-D image 155 is formed at a floating display position 160 in front of the projection apparatus 120. The 3-D image 155 may be overlaid on a 2-D image 157 that is presented outside of housing 124, such as on a screen (not shown) outside of housing 124, to give the viewer the optical appearance of a floating 3-D image. A computer 134 generates a stream of images that are projected by laser projector 121 over path "1" to beam splitter 130.

It is advantageous to use a laser projection system 121 in a projection apparatus such as projection apparatus 120 and in other embodiments of projection apparatuses described below as a laser projection system is able to project a large image without the need for using a relatively large imaging device. For example, there is no need for a 60 inch TV to produce a 60 inch image. This reduces the bulk and weight of the projection apparatus.

In operation, projection apparatus 120 receives data for three-dimensional holographic images at laser projection system 121, and projects those images as a laser beam (or more than one laser beam) along path 131A to beam diverter or splitter 130. Beam diverter 130 (or beam splitter) then projects the laser beam with the images along patent 131B to concave mirror 128. The images reflected from concave mirror 128 then travel along path 131C back through the beam diverter (splitter) 130 and polarizer 126, and then appear as the 3-D holographic image(s) 155 to a viewer at the floating display position 160. This arrangement allows for as much light as necessary to produce the images and to use the anti reflective glass 208 to reduce the brightness so as not to blind a viewer while enhancing the images.

In embodiments, rotating mirrors (not shown in FIG. 2) may be used in lieu of beam diverter or splitter 130 to capture the laser beams from laser projection system 121 and draw an image onto concave mirror 128. This has the advantage of being able to change or refresh the image to be projected more rapidly and more compactly than a beam diverter or beam splitter. In embodiments, rotating mirrors may be operated at a spin rate as fast as 15,000 to 20,000 Hz (rotations per second), the images per revolution that are drawn by the rotating mirrors may be about 288 with a resolution of 768×768, a view angle of 1.25°, and a binary bit depth to present approximately 4320 to 5760 frames/sec. in a volume of 13 cm$^3$.

Polarizer 126 minimizes reflections and glare that may be visible to the observer. Polarizer 126 may be either a linear polarizer or a circular polarizer. In alternative embodiments, an antireflective film 127 is applied to the surface of the beam splitter 130 viewable by the observer. The antireflective film 127 may be combined with the polarizer 126 in other embodiments. In yet another embodiment, the antireflective film 127 is replaced by a ¼ wave retarder, which is combined with the polarizer 126. FIG. 2 illustrates the positional relationship between the polarizer 126 and either the antireflective film or the retarder. The polarizer 126, the mirror 128, the beam splitter 130, and optionally either the antireflective film 127 or the ¼ wave retarder, are optically aligned in a first portion of the housing 124 so that the image formed on the laser projection system 121 is projected outward from concave mirror 128 toward a viewer (observer).

In embodiments, polarizer 126 is a film polarizer applied directly to the surface of the beam diverter or splitter 130 that is oriented toward the observer. Thus, the weight associated with the glass substrate of prior art polarizers is eliminated resulting in lower weight of the system 120 and minimizing the number of discrete components of the system 120. Advantageously, eliminating a discrete polarizer, such as is commonly found in prior art aerial projection display devices, significantly reduces the costs of manufacturing and maintaining system 120. Further, when the system is disassembled for shipment, there are fewer components and less weight, thereby reducing shipping and storage costs.

Concave mirror 128 has a reflecting surface that bulges inward away from the incident light and focuses and reflects light to projects the images out into space at a focal point where a viewer can see it. In the embodiment of FIG. 2, the configuration of concave mirror 128 determines the distance of the focal point from the concave mirror and the location of the floating display position between the object and the concave mirror. Concave mirrors are also called "converging mirrors" because they tend to collect light that falls on them, refocusing parallel incoming rays toward a focus. This is because the light is reflected at different angles, since the normal to the surface differs with each spot on the concave mirror. In embodiments, the concave mirror may be spherical or it may be parabolic. A parabolic concave mirror may be used, for example, to avoid causing possible aberrations at the edges of the image.

Typically, concave mirrors are made of a glass substrate having a concave surface with evaporated aluminum applied as the reflective surface. Glass substrates are typically used in prior art aerial display systems because of a belief that sphericity tolerance, also known as sufficient sphericity, must be maintained to at least, plus or minus 0.05% from one edge to the other to minimize distortion and to ensure realistic reproduction of the object. Unfortunately, glass mirrors are heavy and expensive and have limited commercial applications.

More recently, it has been found to be advantageous to fabricate a concave mirror for a projection apparatus from plastic so that the concave mirror is both lightweight and inexpensive. With a lightweight plastic concave mirror, coupling the concave mirror to housing 124 is simplified. In one embodiment, a shelf 132 is used to support the concave mirror along its bottom edge while a mounting bracket 135 maintains the concave mirror at the proper orientation with respect to the beam diverter/splitter. It has been found that a 15-inch plastic concave mirror with an 18-inch concave radius, or a 10 inch×17 inch concave mirror, is adequate for a wide variety of applications in which projection apparatuses are used to project 3D holographs. Such applications include retail applications for the display of product advertisements, business applications for videoconferencing or sales presentations or home applications replacing a standard computer display or a television set.

Referring again to FIG. 2, housing 124 includes a thermal control switch 150 to maintain operating ambient temperatures inside the housing 124 below at least 100° F. and preferably to about 85° F. To achieve this environment, a plurality of fans 152 are coupled to the control switch 150. The fans create air movement in the second portion of the housing 124 and particularly around the laser projection system 121 to minimize ambient heating. Similarly, in embodiments of the invention described below, a similar thermal control switch and/or one or more cooling fans may be included inside the housing of any of those embodiments.

With the illusion of a three dimensional holographic image that may be changed at video rates, it is also possible to combine real time video feedback with the floating image. Specifically, a floating display of a 3D animated image is displayed for viewing by at least one observer. A video camera 158 (FIG. 2), mounted on or located proximate to the housing 124 is coupled to the computer 134. The video camera 158 detects the presence of the observer and combines the real-time video image with the animated image. In this manner, the observer becomes a part of the displayed image. This feature is very effective for products, such as a mobile video-phone where the observer/viewer can see how they will appear to someone having a video-phone or an automobile.

The embodiment of FIG. 2 improves the brightness of the projected images through the use of a laser beam. However, projection apparatus 120 does not permit the focal point of the concave mirror 128 to be changed without also changing the concave mirror itself. Therefore, when a larger projected image is desired, a larger concave mirror 128 is necessary to enlarge the projected image. Also, in embodiments, such as in the embodiment of FIG. 2, to change the distance from display system 120 at which the image is holographically projected, the concave curvature of concave mirror 128 needs to be changed.

Figure 3:
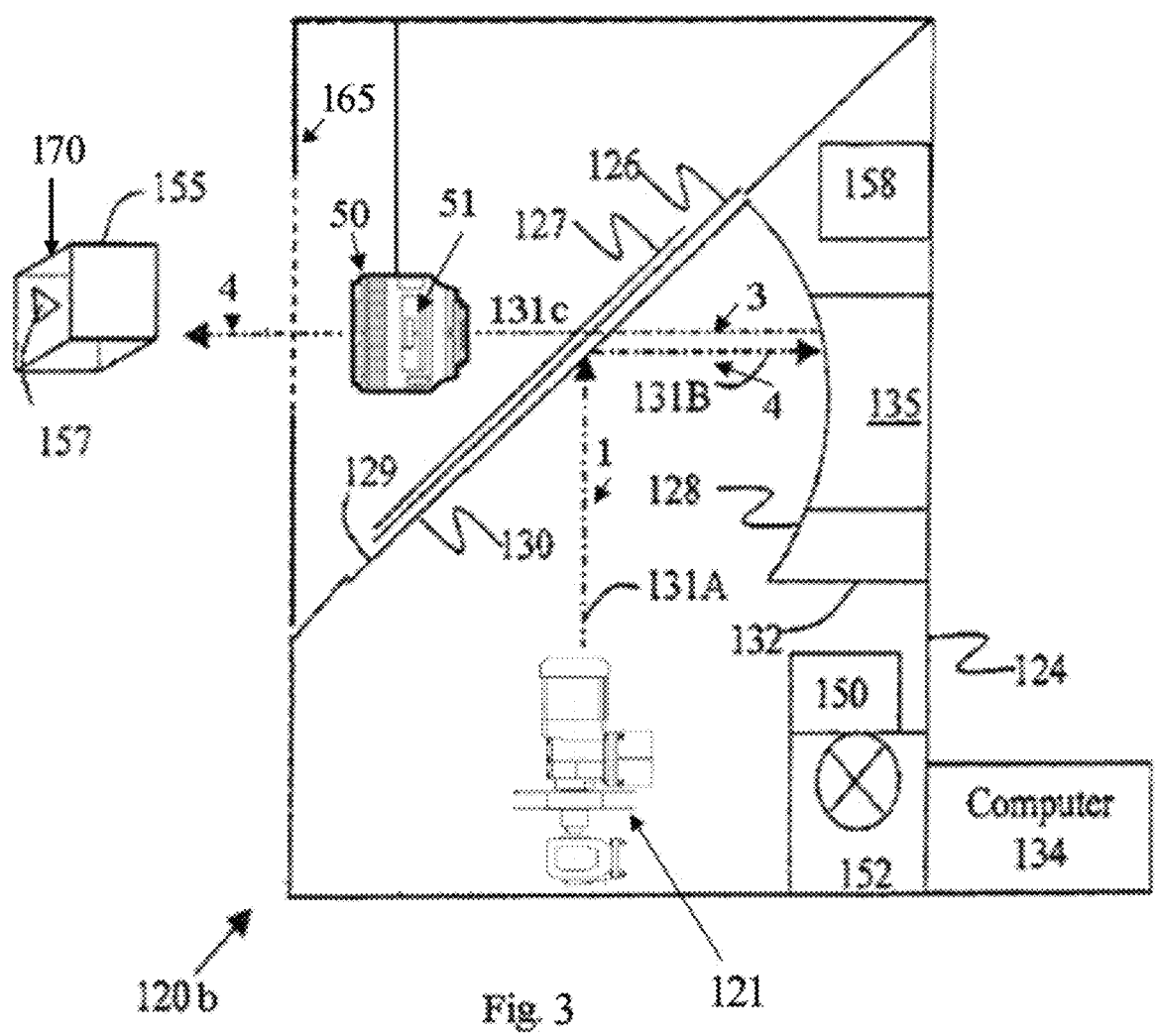
FIG. 3 illustrates a projection apparatus for displaying three-dimensional holographic images in accordance with another embodiment of the present invention.

FIG. 3 shows another embodiment of a projection apparatus in accordance with the present invention in which a lens 50 (or a series of lenses) is added to enhance the image projection capabilities of the projection apparatus/projection system 120 of FIG. 2. In embodiments, lens 50 could be a Fresnel lens, a series of glass concave and convex lenses, or a combination of both. Lens 50 is positioned to be placed inside the housing 124 and spaced away from a wall of housing 124, such as the wall 165 through which the images are projected to a floating display position. The addition of the lens 50 enables the adjustment of the position to which the image is projected and/or the size of the projected images without changing concave mirror 128 to a different size, position, or concave curvature (e.g. larger and/or less concave to project larger images and smaller or more concave for smaller images).

An adjuster 51 is provided on lens 50 to change the focal point of the floating display position and/or size of the floating images, where lens 50 is configured to allow a change in focal point and/or size. Adjuster 51 provides for changing the size of the projected images where lens 50 is configured to allow a change in image sizing. This is significant particularly as larger concave mirrors can be very costly. Adjuster 51 may be electronically controlled from outside of housing 124 either manually or with an automated control. Additionally, the size of the concave mirror 128 used affects the size of the entire projection apparatus. The addition of lens 50 thus allows the entire projection apparatus to be reduced in size, such as, for example, by as much as a third of its potential size or even more. Indeed, the size of concave mirror 128 may be reduced from a size of approximately 150 square inches or more to a size as small as 2 inches due to lens 50.

FIG. 3 uses the same reference numbers as FIG. 2 to denote the same elements. As in the embodiment of FIG. 2, the projection system 120B here includes a housing/outside shell 124 that acts like a darkroom and includes a computer 134, a laser projector 121, a beam diverter or beam splitter 130, and a concave mirror 128. Computer 134 generates a stream of images that are projected by laser projector 121 over path "1" to beam splitter 130. A beam diverter, which may be a beam splitter 130, reflects the images onto concave mirror 128 over path "2". The images are reflected from concave mirror 128 back through the beam splitter 130 (path "3") through lens 50 and outside of housing 124 to a floating display position/space 170 (path "4") to be displayed as image(s) 155. In this embodiment, floating display position 170 may be, for example, 2-15 feet away from lens 50.

In embodiments, the projected floating image may be projected through a transparent screen (e.g., that uses organic LED (OLED) technology) (not shown) is located outside of and spaced away from the exterior of housing 124. A 2-D background may be displayed on the transparent screen while the three-dimensional holographic images are projected through the transparent screen. Similarly, a transparent screen may be used in conjunction with any projection apparatus of the other embodiments described herein.

Laser projection system 121 is configured to project video images using a laser beam, which may include one or more laser sources for single color projection or uses multiple colored laser sources, such as red, green and blue laser diodes, to name a few. Alternatively, laser projection system 121 may project video images with multiple laser beams, such as with two or more laser heads, for projecting full color images. One example of a suitable laser projection system is the Christie® 3-Primary (3P) RGB laser projector or the Christie® 6-Primary (6P) RGB laser systems from Christie Digital Systems USA, Inc. of Cypress. Laser projection system 121 includes at least one or more video inputs for inputting image data for the three-dimensional holographic images, a video processor for generating the video images corresponding to the image data input via the one or more video inputs, and a laser output operatively connected to the video processor and configured to output the laser beam comprising the video images corresponding to the input image data.

In embodiments, an internal processor may be used in conjunction with software or firmware modules and a USB port (not shown) that can store the images to be projected so that computer 134 is unnecessary. Also, in embodiments, laser projection system 121 may be remotely connected to another computing source, such as through an network connection, like the Internet, a LAN, or a WAN, to name a few, using a wired or wireless connection, such as new Low Powered LTE for the Internet of Things (IOT) and other protocols.

Laser projection system 121 transmits one or more laser beams to beam diverter or splitter 130. Beam diverter or splitter 130 is fabricated from a polarized material (linear or circularly polarized) that, when the images are reflected at it, bends the polarized beam by approximately 45° and directs the polarized laser beam to be incident toward concave mirror 128. As the light reflected from concave mirror 128 is polarized, the polarized images pass right through the beam splitter 130 and lens or series of lenses 50 for focusing the floating image outside the device 155. Any non-polarized portion of the image may dissipate.

In embodiments, rotating mirrors may be used in lieu of beam diverter or splitter 130 to capture the laser beams from laser projection system 121 and draw an image onto concave mirror 128. This has the advantage of being able to change or refresh the image to be projected more rapidly and more compactly than where a beam diverter or beam splitter is used. As noted above, in embodiments, rotating mirrors may be operated at a spin rate as fast as 15,000 to 20,000 Hz (rotations per second), the images per revolution that are drawn by the rotating mirrors may be about 288 with a resolution of 768×768, a view angle of 1.25°, and a binary bit depth to present approximately 4320 to 5760 frames/sec. in a volume of 13 cm$^3$.

FIG. 4(*a*) illustrates another exemplary embodiment of the present invention in which three-dimensional holographic images 206 are projected by a projection apparatus 200 to a floating display position 216. In this embodiment, projection apparatus 200 includes a housing 201 that encloses a laser projection system 202, a beam diverter 203, a concave mirror 204, a lens (or series of lenses) 205 and anti-reflective glass 209. In embodiments, housing 201 may include walls, including wall 201*a*. Projection apparatus 200 may further include at least one cooling fan 207, a thermal control switch (not shown) to control cooling fan 207, and an ultrasonic transducer 208.

Laser projection system 202 is used to generate three-dimensional holographic video images using a laser beam. Laser projection system 202 includes one or more video inputs 202*a* for inputting image data for the three-dimensional holographic images, a video processor 202*b* for generating the video images corresponding to the image data input via the one or more video inputs 202*a*, and a laser output 202*c* that is operatively connected to video processor 202*b* and configured to output the laser beam that include the video images corresponding to the input image data. The projected laser beam may include one or more laser sources for single color projection or uses multiple colored laser sources, such as red, green and blue laser diodes, or may project video images with multiple laser beams, such as with two or more laser heads, for projecting full color images. As noted above, an example of a suitable laser projection system is the Christie® 3-Primary (3P) RGB laser projector or the Christie® 6-Primary (6P) RGB laser systems from Christie Digital Systems USA, Inc. of Cypress. Laser projection system 202 may have multiple video inputs 202a for various reasons such as to account for different video sources or different video formats. In embodiments, video is input through a USB port 202d at laser projection system 202.

Laser projection system 202 projects one or more beams onto beam diverter/splitter 203, which is placed so as to receive each laser beam and to divert the projected laser beam(s) to concave mirror 204. In embodiments, beam diverter 203 is angled at approximately 45 degrees from the direction of the laser beam(s) such that the laser beam(s) are reflected from beam diverter 203 and directed onto concave mirror 204 at an angle of approximately 90 degrees from the direction at which the laser beam(s) are projected from laser projection system 202. In embodiments, beam diverter 203 is a polarization beam splitter, that polarizes the light beam and captures a linear or circular polarization to be directed onto concave mirror 204.

In embodiments, rotating mirrors may be used in lieu of beam diverter or splitter 203 to capture the laser beams from laser projection system 202 and draw an image onto concave mirror 204. This has the advantage of being able to change or refresh the image to be projected more rapidly and more compactly than where a beam diverter or beam splitter. In embodiments, rotating mirrors may be operated at a spin rate as fast as 15,000 to 20,000 Hz (rotations per second), the images per revolution that are drawn by the rotating mirrors may be about 288 with a resolution of 768×768, a view angle of 1.25°, and a binary bit depth to present approximately 4320 to 5760 frames/sec. in a volume of 13 $cm^3$. In embodiments, where rotating mirrors are used, a different source of reference light may be used in conjunction with the rotating mirrors to provide the 3-D effect.

Concave mirror 204 may be similar to concave mirror 128 (or converging mirror) described above. It has a reflecting surface that bulges inward (away from the incident light). Concave mirrors reflect light inward to a focal point. Thus, concave mirror 204 focuses the reflected light of an image to project the image out into space at a focal point (floating display position) where a viewer can see it. Concave mirrors show different image types depending on the distance between the object and the concave mirror. The specific curvature of concave mirror 204 determines the focal point of the image, absent the presence of lens 205. However, where lens or series of lenses 205 have an adjuster for adjusting the distance of the focal point, the lens or series of lenses will also affect the location outside the housing 201 to which the image(s) are projected. As with concave mirror 128, in embodiments, concave mirror 204 may be spherical or it may be parabolic. A parabolic concave mirror may be used, for example, to avoid causing possible aberrations at the edges of the image.

As noted above, traditionally, mirrors, such as concave mirror 204, are made of a glass substrate which makes them very heavy. Metal can be used as a substrate, which is thinner than glass, but metallic mirrors may also be heavy. Thus, plastic acrylic concave mirrors have become popular as a lightweight and lower cost alternative. Other types of suitable materials for fabricating a plastic concave mirror 204 include, for example, PETG mirror sheets, polycarbonate mirror sheets, to name a few, that may include coatings such as an ARMADILLO coating.

In embodiments, concave mirror 204 may be mounted inside housing 201 and have an electronically adjustable membrane (not shown) that can be either mechanically or vacuum controlled, such that the position of the respective concave mirror may be electronically adjusted, such as remotely with a controller outside of the housing, to adjust the position of concave mirror 204. This adjustment may be used in conjunction with adjustments to lens 205 to adjust the focal point of the projected holographic images. Similarly, in the embodiments of FIGS. 2 and 3, concave mirror 128 may be modified to have an electronically adjustable membrane (not shown) that can be either mechanically or vacuum controlled, such that the position of the respective concave mirror may be electronically adjusted, such as remotely with a controller outside of the housing, to adjust the position of concave mirror 128. This adjustment of the membrane may be used either by itself or in conjunction with an adjustment of lens 50 to adjust the focal point of the projected holographic images.

Lens or series of lenses 205 are placed and mounted inside of housing 201 and are spaced away from a wall of the housing 201, such as from wall 201a of housing 201, which is the wall through which the holographic images are projected outside of housing 201. The laser beam that is reflected from concave mirror 204 is directed through lens 205 and then projected to floating display position 216. Thus, as in the embodiment of FIG. 3, the inclusion of lens 205 in projection apparatus 200 shown in FIGS. 4(a), 4(b), 4(c), and 4(d) enables the adjustment of the distance to which the three-dimensional holographic images 206 are projected by projection apparatus 200 to the floating display position, such as positions 216 or 217 and/or enables an adjustment of the size of the projected images using an adjuster 251 to change the focal point. Consequently, as a result of using lens 205, it is unnecessary to change the concave mirror 204 to have different properties, such as a different size and concave curvature of the concave mirror 204, when it is desired to change the floating display position relative to housing 201. Lens 205 may be a single lens assembly or a series of lenses that are configured to allow for the adjustment of the focal point and size of the three-dimensional holographic images that are projected. In embodiments, lens 205 includes one or more Fresnel lenses. In embodiments, a filter may be placed on lens 205.

In embodiments, the focal point of a lens may be determined by the lens maker's equation:

$$\frac{1}{f} = (n-1)\left[\frac{1}{R_1} - \frac{1}{R_2} + \frac{(n-1)d}{nR_1R_2}\right], \frac{1}{f} = (n-1)\left[\frac{1}{R_1} - \frac{1}{R_2} + \frac{(n-1)d}{nR_1R_2}\right],$$

where f is the focal length of the lens, n is the refractive index of the lens material, R 1 is the radius of curvature (with sign, see below) of the lens surface closer to the light source, R 2 is the radius of curvature of the lens surface farther from the light source, and d is the thickness of the lens (the distance along the lens axis between the two surface vertices). The focal length f is positive for converging lenses, and negative for diverging lenses. The reciprocal of the focal length, 1/f, is the optical power of the lens. Where the focal length is provided in meters, the optical power is measured in diopters (inverse meters).

Projection apparatus 200 further includes an anti-reflective coated glass 209 that is mounted to the exterior of housing 201 for projecting the three-dimensional holographic images through the anti-reflective coated glass 209 after the laser beam passes through lens or series or lenses 205. Anti-reflective coated glass 209 is a glass that has been optically coated on one or two sides to diminish reflections and increase the light transmission, to reduce surface glare and increase substrate transmission and brightness and to offer better contrast definition by reducing surface reflection over a specific wavelength range. Glass 209 therefore helps to minimize and possibly eliminate ghost images and multiple reflections when an anti-reflective coating is applied to the surface of glass 209. The size of anti-reflective coated glass 209 should be sufficiently large for the laser beam reflected from concave mirror 204 to pass through the glass when projected toward the floating display position. Anti-reflective coated glass 209 prevents interference by ambient lighting in the projection of the images outside of housing 201 and thus reduces the power output of LEDs required to project images at a desired brightness. Where a very bright laser projection system 202 is used, the coating on anti-reflective coated glass 209 may be selected to reduce the brightness of certain projected images when warranted (e.g., from 6000 lumens to 3000 lumens).

Projection apparatus 200 typically also has at least one cooling fan 207 as the heat generated by laser projection system 202 needs to be exhausted.

In embodiments, a translucent glass screen (not shown) may be positioned outside of and spaced away from the exterior of housing 124 in front of projection apparatus 200. This provides depth to the projected holographic images upon passing through the glass screen. If the glass screen is used as a monitor it will display a 2D image as a background for the hologram. If a 4 k or 8 k translucent glass screen is used, the glass screen may provide, due to the high resolution of the glass screen, the appearance of depth, which may be achieved with or without a viewer having to wear 3D glasses. Another advantage to using the translucent screen this way is that we can produce a touch interactive hologram that will react when interacted with. The translucent glass screen may also be used in conjunction with any other embodiments of projection apparatuses described herein to provide similar advantages.

It is also desirable that projection apparatuses, such as projection apparatus 120 or 200, be able to reproduce audio to provide a "touch hologram," whereby a viewer will hear one or more sounds when the viewer touches, feels and manipulates objects projected into space at the floating display position to give the viewer a feel for projected objects via audio feedback although those objects are only holographic. Having a motion sensing capability—such as to track a user's hands with an ultrasound pressure system—will conjure to the viewer the sensation of pressure on bare skin, thereby enhancing the reality of a hologram. Thus, additional components, and/or circuitry, generally represented in FIG. 6 may be included, such as the following:

Ultrasound pressure system—ultrasonic transducers 208 may be included in projection apparatus 200 to evaluate targets by interpreting the reflected signals. For example, by measuring the time between sending a signal and receiving an echo the distance of an object can be calculated. Passive ultrasonic sensors are basically microphones that detect ultrasonic noise that is present under certain conditions. In our case, the image is at a known distance and the sound waves reflected back to the ultrasound pressure system by a hand will let the software not only know if the hand has grabbed the image but can create a sense of feel. The ultrasound receiver is always monitoring for any signal and the reflection of the hand changes the signal return time so the software knows where the hand is in relation to the image. As shown in FIG. 4, one or more ultrasonic transducers 208 may be mounted to the outside of housing 201 in the vicinity of the laser beam output from projection apparatus 200. When the viewer touches the projected images at the floating display position, transducer(s) 208 detect the position of a viewer's hand touching the projected images ultrasonically by measuring the timing between sending a signal and receiving back an echo of that signal. In response to receiving an echo, transducer(s) 208 transmits low energy electrical pulses such that the viewer senses the touching of the holographic images.

Color VGA video camera—The video camera aids in facial recognition to identify a position of a viewer such that the objects are displayed in a position appropriate to the viewer. The video camera also aids in other detection features by detecting at least three color components: red, green and blue.

Depth sensor—An infrared projector and a monochrome CMOS (complimentary metal-oxide semiconductor) sensor work together to "see" the room in 3-D in which the projection system is located regardless of the lighting conditions. The sensor may be used to detector where the viewer's hand is in relation to the image so that the viewer can touch and feel the image, as with audio feedback. The sensor may also be used to display the 3-D object in an appropriate location.

Multi-array microphone—An array of microphones (e.g., four microphones) may isolate the voices of the viewers from the noise in the room. This allows voice control so the viewer can be a few feet away from the microphone and still use voice controls.

In operation, projection apparatus 200 receives data for three-dimensional holographic images at laser projection system 202, and projects those images as a laser beam (or more than one laser beam) along path 101L to a beam diverter 203 or splitter. Beam diverter 203 (or beam splitter) then projects the laser beam with the images along patent 102L to a concave mirror 204. The images reflected from concave mirror 204 then travel along path 103L back through the beam diverter (splitter) 203, pass through lens 205, and appears as holographic images 206 to a viewer at the floating display position 216. This arrangement allows for as much light as necessary to produce the images and to use the anti reflective glass 208 to reduce the brightness so as not to blind a viewer while enhancing the images.

In embodiments, as shown in FIG. 4(*b*), the floating display position of the projected three-dimensional holographic images may be changed from a first floating display position 216 to a second floating display position 217 (or some other floating display position that is different from the first floating display position 216) using adjuster 251 on lens 205. For example, in FIG. 4(*b*), an adjustment has been made to move the floating display position to floating display position 217 that is closer to projection apparatus 200. Also, in embodiments, as shown in FIGS. 4(*c*) and 4(*d*), adjuster 251 may be used to change the size of the projected images, such as to enlarge the images shown in FIG. 4(*a*) while the projected images may remain in floating display position 216, for example. Similar adjustments of the floating display position and the size of the images to be displayed at a floating display position may also be provided for on lens 50 in the embodiment illustrated in FIG. 3.

FIG. 4(*d*) shows another exemplary embodiment that is similar to the embodiment shown in FIG. 4(*c*) but with a rotating mirror 220 used in lieu of a beam diverter/splitter 203, as described below with respect to FIG. 11. In embodiments, rotating mirror 220 may be used to paint an image directly onto the concave mirror 204 without the use of a beam splitter. In embodiments, a material, such as a phosphor, may be applied to the rotating mirror 220 to extend the persistence of a brief event, i.e, such as make an image last longer. The application of a material, such as a phosphor, to rotating mirror 220 may be unnecessary with a fast rotational speed of the rotating mirror.

In embodiments, rotating mirror 220 may be miniaturized and is placed in a smaller device, without including the beam splitter. In such embodiments, miniaturized rotating mirror 220 can then be positioned closer to lens 205 to either enlarge or move the image projected at floating display position 216. In embodiments, different filters may then be attached to lens 205 to produce effects depending on the situation.

In embodiments, a filter of anti-reflective glass 209 may be attached to the outside of the rotating mirror. In embodiments, a filter may be attached directly to lens 205 to achieve special effects. These same filters can be used on lens 205 in a variety of configurations.

Figure 4A:
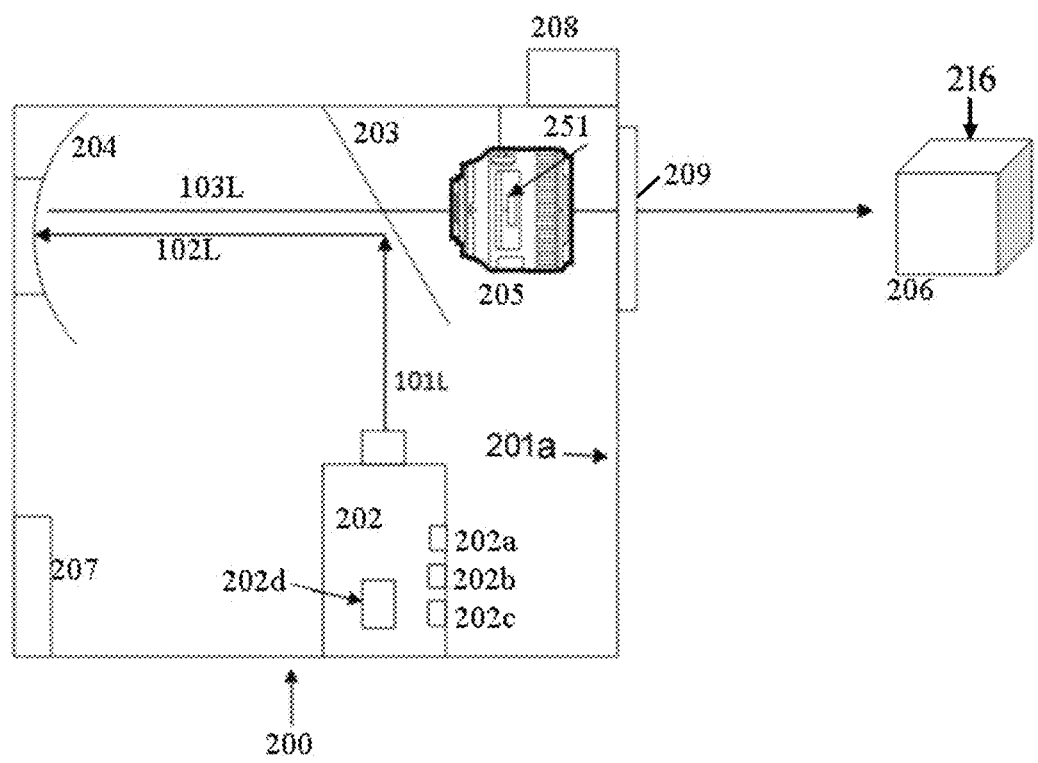
FIG. 4(a) illustrates a projection apparatus in accordance with another embodiment of the present invention for displaying holographic images at a first floating display position.
Figure 4B:
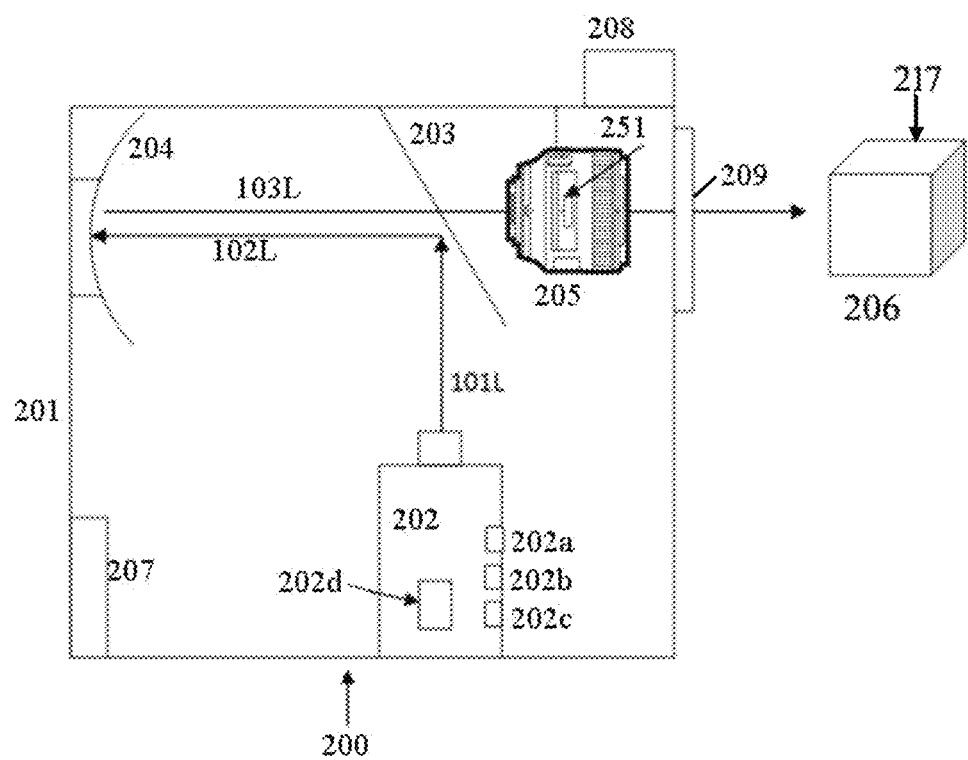
FIG. 4(b) illustrates the projection apparatus of FIG. 4(a) where the lens has been adjusted to display the holographic images at a second floating display position that is a different distance from the lens than the first floating position.
Figure 4C:
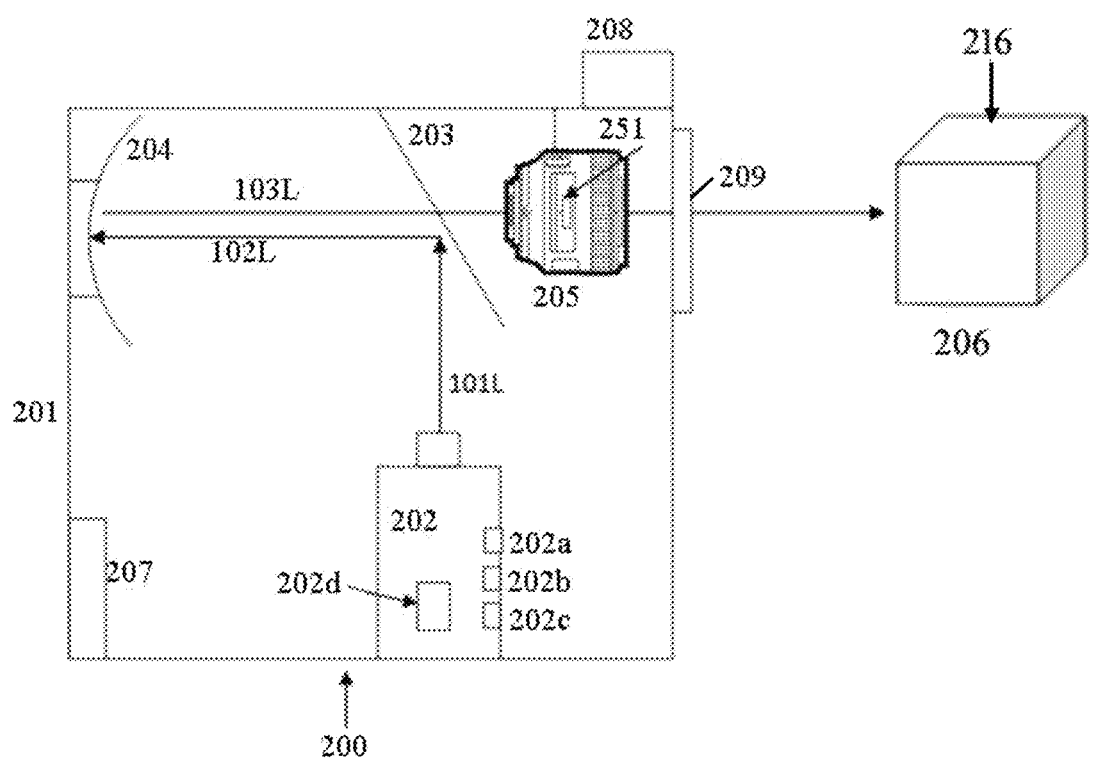
FIG. 4(c) illustrates the projection apparatus of FIG. 4(a) where the lens has been adjusted to display the holographic images in a larger size.
Figure 4D:
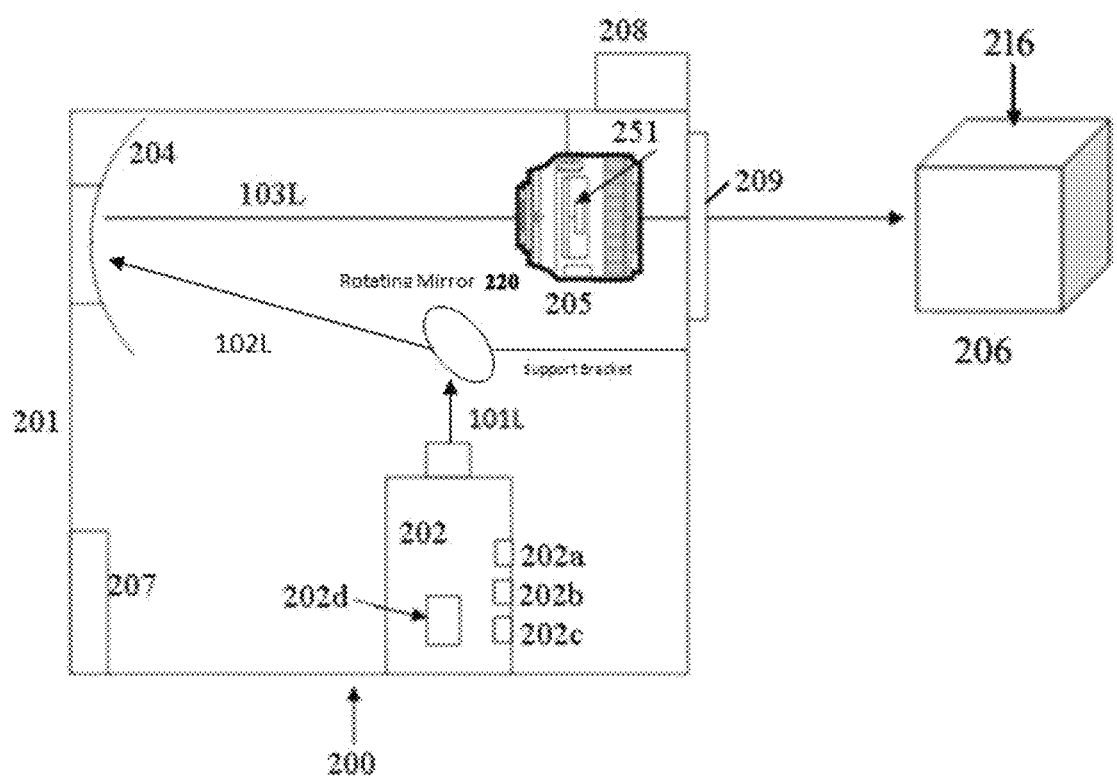
FIG. 4(d) illustrates a projection apparatus in accordance with another embodiment of the present invention in which a rotating mirror is used in lieu of a beam diverter/splitter) where the lens has been adjusted to display the holographic images in a larger size.

In embodiments, rotating mirror 220 of FIG. 4(d) may be external to the laser projection system 202 as shown or may be located inside the laser projection system 202.

Figure 12A:
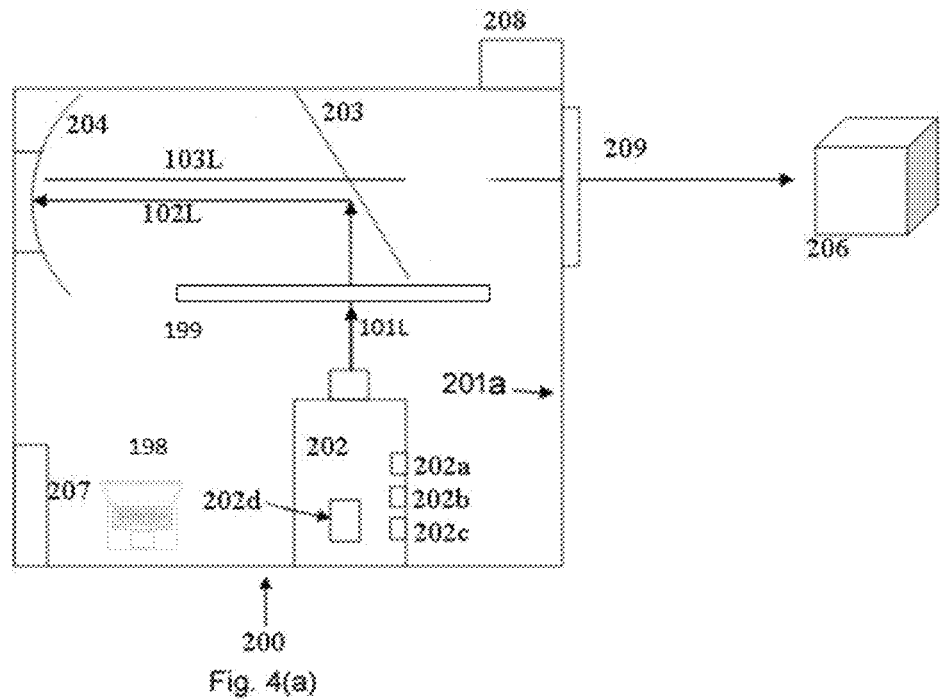
FIG. 12(a) illustrates a projection apparatus in accordance with another embodiment of the present invention for displaying holographic images in which a diffuser screen is positioned at a first position within the housing of the apparatus.

FIG. 12(a) shows another exemplary embodiment in which an optical diffuser screen ("diffuser") 199 is included within a projection apparatus 200', similar to the apparatus of FIG. 4(a), where diffuser 199 is inserted between laser projection system 202 and beam diverter 203. In the illustrated embodiment, laser projection system 202 is located at a bottom of housing 201 and projects a laser beam upward, and diffuser 199 is positioned at a first position above the upward-projecting laser projection system 202 at a vertical level, which may be approximately at or below the bottom edge of beam diverter 203. Diffuser 199 more evenly distributes the light from the laser beam while eliminating bright spots before it is incident onto beam diverter 203.

A diffuser 199 is particularly useful where the laser projection system 202 projects has a relatively low maximum brightness, such as, for example, at a brightness of approximately 1000 lumens or below, or at approximately 200 lumens or below. At this relatively lower brightness, the projection apparatus may need to be in a room that is relatively dark or may need to be used within a hood to block ambient light from diffuser 199. In contrast, where a laser projection system has a much higher lumens, such as in the thousands or tens of thousands of lumens, the projection apparatus may be used in a lighted room.

Projection apparatus 200' may further include a lens (or series of lenses)(not shown), such as lens 205 and an adjuster 251 in FIG. 4(a), such as to adjust the size of the image or the floating display position of the image.

The diffuser 199 in projection apparatus 200' may be made of any translucent material, such as a white sheet of paper (e.g., a standard sheet of copy paper), a plastic bag or a fabric. Diffuser 199 may be part of, or attached to, laser projection system 202 or may be positioned at a distance above laser projection system 202, with the specific distance from laser projection system 202 depending on the desired size of the image to be projected onto beam diverter 203. For example, where a larger image is desired, diffuser 199 may be positioned further from laser projection system 202 and closer to beam diverter 203. Using a laser projection system 202 that has a brightness of about 200 lumens, the size of the image to be projected onto beam diverter 203 is approximately 12 inches for a 12 inch distance from the laser projection system 202.

In operation, in the embodiment shown in FIG. 12(a), projection apparatus 200' receives data for three-dimensional holographic images at laser projection system 202, and projects those images as a laser beam along path 101L upward toward diffuser 199. The beam passes through diffuser 199 and is projected onto beam diverter 203 or splitter. Beam diverter 203 (or beam splitter) then projects the laser beam with the images along patent 102L to concave mirror 204. The images reflected from concave mirror 204 then travel along path 103L back through the beam diverter (splitter) 203, (optionally pass through a lens, not shown), and appear as holographic images to a viewer at the floating display position 206. Anti reflective glass 208 is provided to reduce the brightness so as not to blind a viewer while enhancing the images.

Figure 12B:
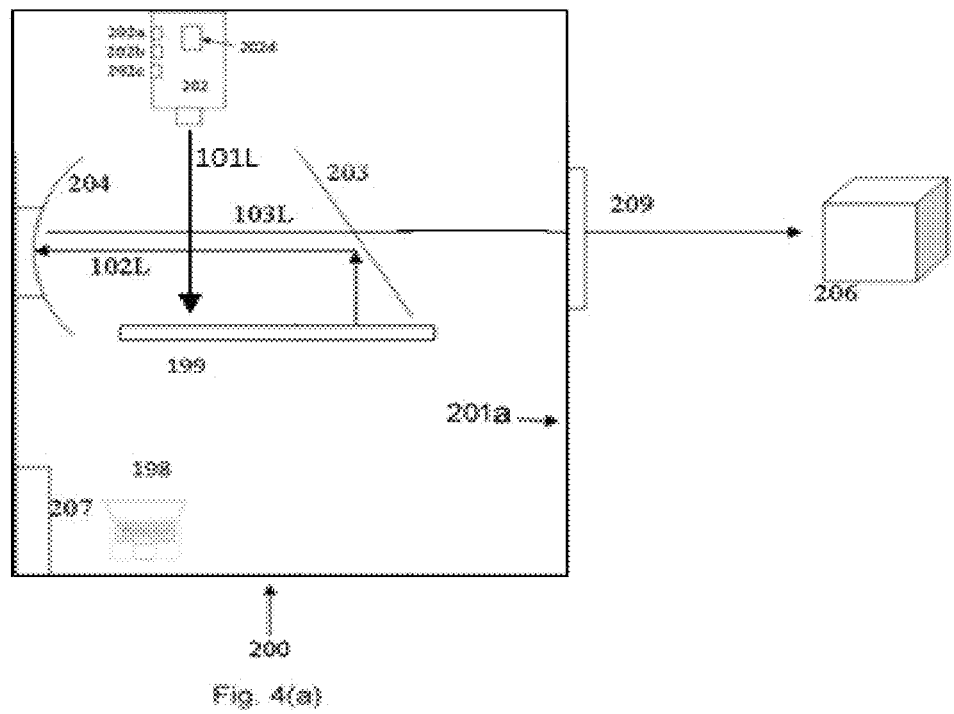
FIG. 12(b) illustrates a projection apparatus in accordance with another embodiment of the present invention for displaying holographic images in which a diffuser screen is positioned at a second position with the housing of the apparatus.

FIG. 12(b) shows another exemplary embodiment of a project apparatus 200" in which a diffuser 199 is inserted between laser projection system 202 and beam diverter 203. In this embodiment, laser projection system 202 is positioned at the top of housing 201 and projects a beam downwardly toward beam diverter 203. In projection apparatus 200", diffuser 199 may be made of any reflective material, such as, for example, a white sheet of paper (e.g., a standard sheet of copy paper that may be used in the projection apparatus 200'), that is positioned at a second position within housing 201 at a vertical level that is approximately at or below the bottom edge of beam diverter 203. In operation, in this embodiment, the laser beam that is projected from laser projection system 202 down onto the diffuser 199 is reflected back upward from diffuser 199 and onto beam diverter 203. In this embodiment, projection apparatus 200" may further include a lens (or series of lenses)(not shown), such as lens 205 and an adjuster 251 in FIG. 4(a), such as to adjust the size of the image or the floating display position of the image.

While projection apparatus 200' is illustrated in FIG. 12(a) in a particular orientation with the laser projection system 202 pointing upward, the invention is not so limited. For example, projection apparatus 200' may be turned upside down such that laser projection system 202 is at the top and projecting the laser beam downward to pass through diffuser 199 and onto beam diverter 203. Similarly, projection apparatus 200" illustrated in FIG. 12(b) may be oriented in a different orientation, such as having the laser projection system 202 at the bottom and projecting upward to be reflected from diffuser 199.

The projection apparatuses of FIGS. 2, 3, 4(a), 12(a) and 12(b) may be used to project three-dimensional (3-D) holographic images 155 in space at a floating display position. A viewer may see all sides of images projected to the floating display position as a 3-D object or objects when the viewer stands in a particular spot and the projected images are rotated by the respective projection apparatus. However, in these embodiments, a person viewing the object cannot see a projected stationary object from multiple perspectives when walking around the objects 360°. At best, the viewer may see the projected object from an arc of about 60° around the object.

In alternative embodiments of a projection apparatus, object/image 155 may remain stationary, without being rotated, but all sides of an object may be seen by a viewer by walking around the projected object 360°. In an exemplary embodiment where the object appears to be a 3-D object to a viewer, the 3-D effect may be achieved using multiple projection subsystems of FIG. 2, 3, 4(a), 12(a) or 12(b), such as three or four subsystems, each positioned at a different position around the floating display position, such as by mounting each respective projection subsystem at an angular position about the floating display position. For example, the multiple projection subsystems may be positioned in a circle or other polygonal shape around a floating display position so that the projected images can be overlapped and a viewer can walk around the image and not block any one view. In these embodiments, the same images are synchronously projected to the same location in space, the floating display position, but the images projected by each projection subsystem are rotated and sized to account for the different position of each projection subsystem. The images projected in this manner overlap to provide the desired 3-D appearance from multiple viewing positions. For example, in embodiments, the number of projection subsystems that simultaneously project the same image may be two, three, or four, to name a few. In embodiments, the projection subsystems are spaced around the floating display position and are spaced apart from one another equidistantly at an angle of approximately 360°/x where x equals the number of projection subsystems in the projection apparatus. The placement of each subsystem may be achieved by computer-controlled servos. In other embodiments, the projection subsystems need not be evenly spaced around the floating display position. In the latter case, in embodiments, one or more ultrasonic transducers may determine the viewer's position and automatically adjust the position of the floating image. The position adjustments of the projection subsystems can be achieved by computer-controlled servos. In embodiments, the subsystems are networked together or synchronously controlled by a controller (not shown) to operate synchronously.

Figure 5:
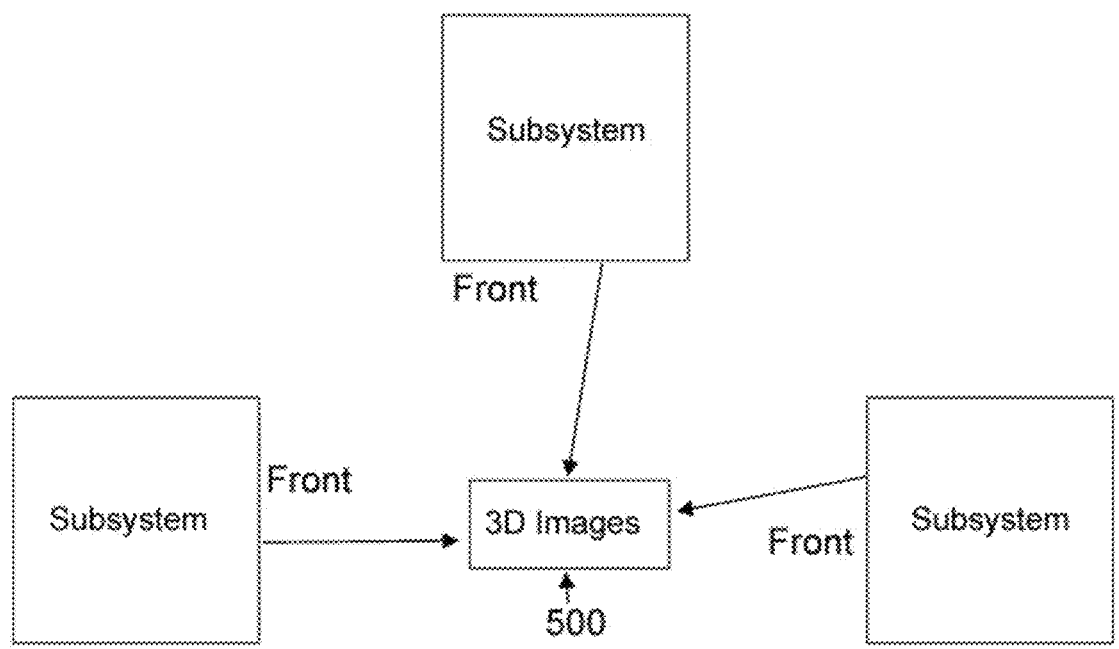
FIG. 5 illustrates a projection apparatus in accordance with another embodiment of the present invention in which multiple projection apparatuses are used as subsystems for displaying holographic images viewable from a 360° perspective.
Figure 6:
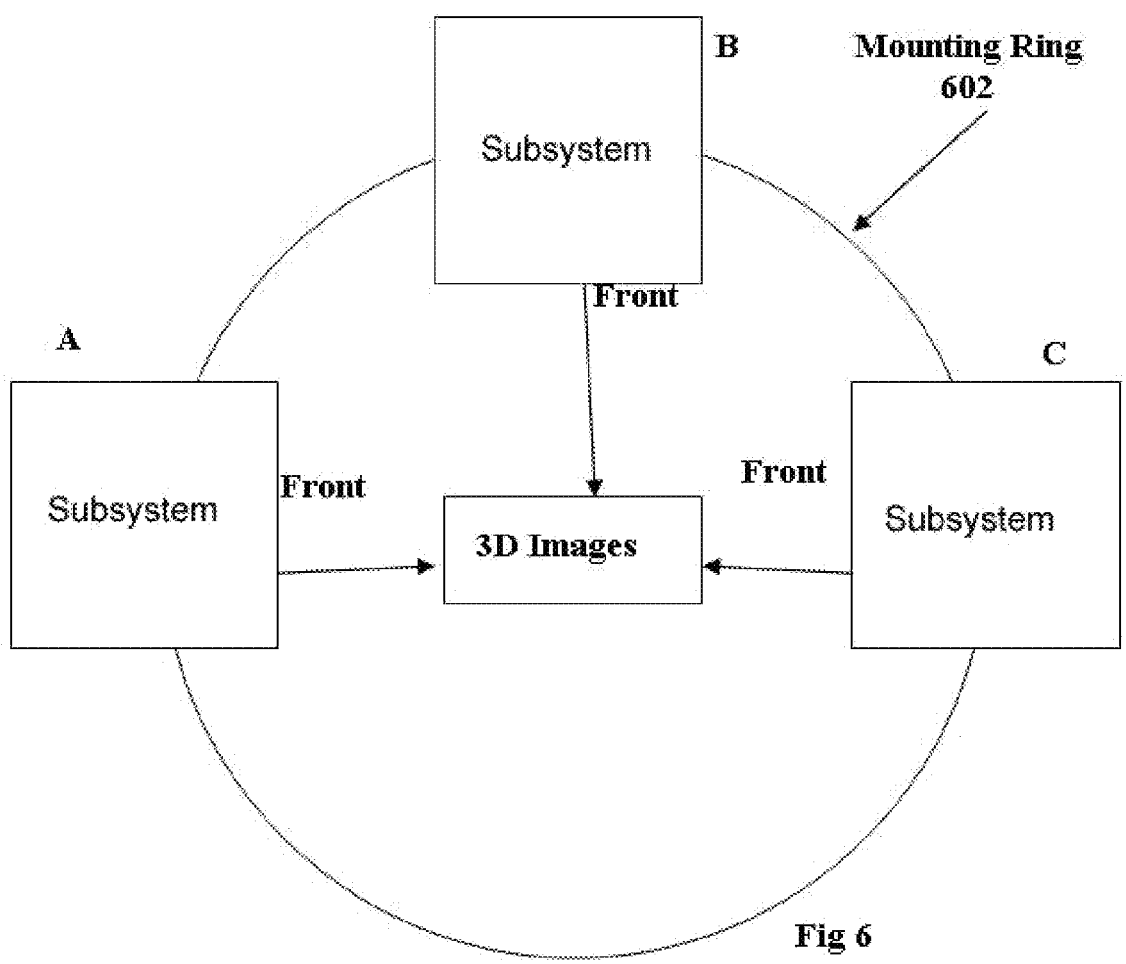
FIG. 6 illustrates a projection apparatus in accordance with another embodiment of the present invention in which multiple projection apparatuses are used as subsystems for displaying holographic images viewable from a 360° perspective.

FIG. 5 shows a projection apparatus/system in which three projection apparatuses chosen from apparatuses 120 (FIG. 2 or 3), projection apparatus 200 (FIG. 4(*a*)), projection apparatus 200' (FIG. 12(*a*)), or projection apparatus 200" (FIG. 12(*b*)) are implemented as subsystems of a larger projection apparatus such that, embodiments of the projection apparatuses, such as those illustrated in FIGS. 2, 3, 4, 12(*a*) and 12(*b*) are positioned to surround the space in which the 3-D object/image is to be projected. In this manner, the image will appear at a floating display position 500 to a viewer walking around the projected object as any object in the real world. FIG. 6 illustrates another such system where three projection subsystems 120, 200, 200' or 200", embodiments of which are illustrated in FIGS. 2, 3, 4(*a*), 12(*a*), and 12(*b*) where each of the projection subsystems are mounted to a mounting ring 602 and positioned to direct the object/image downward and inward for viewing at the floating display position 600.

Figure 7:
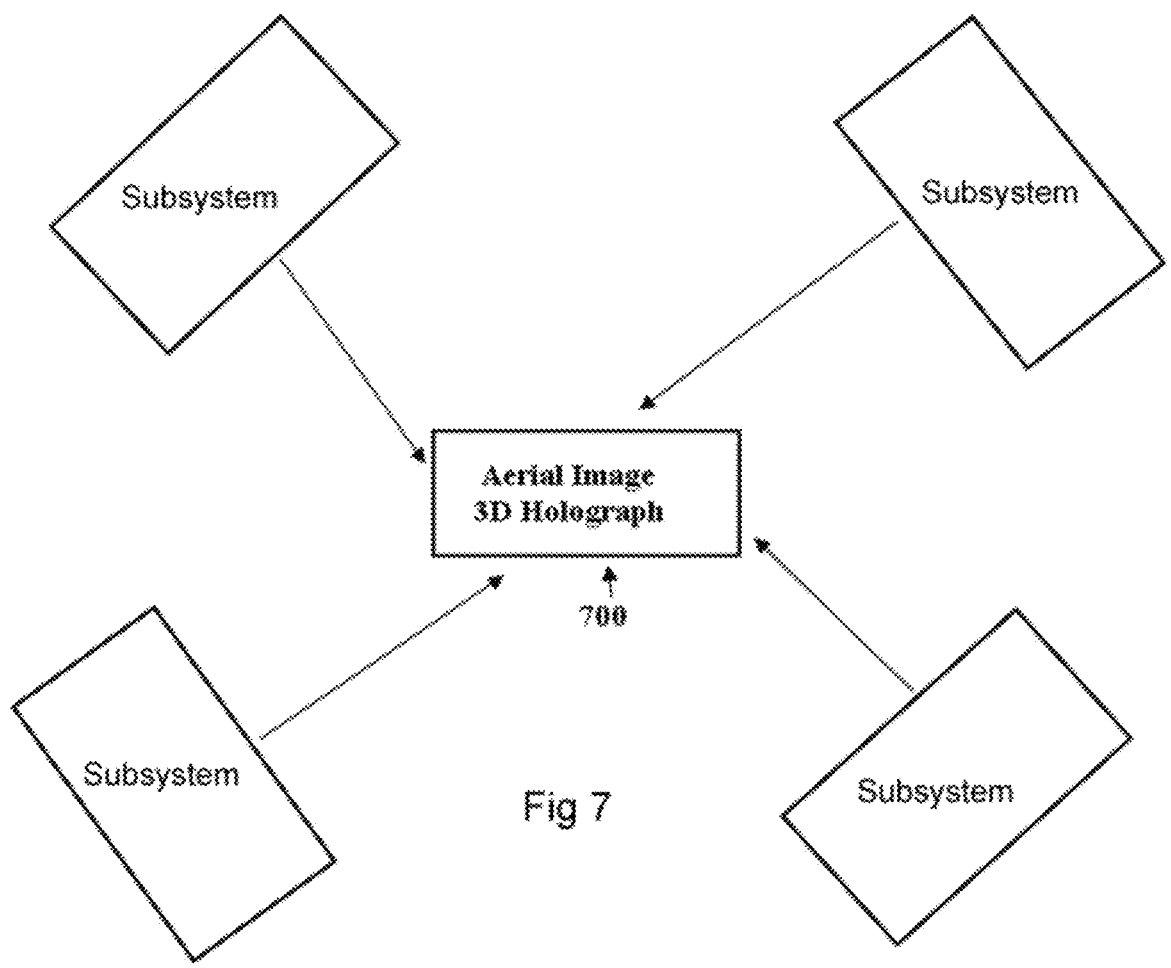
FIG. 7 illustrates a projection apparatus in accordance with another embodiment of the present invention in which multiple projection apparatuses are used as subsystems for displaying holographic images viewable from a 360° perspective.

FIG. 7 illustrates another embodiment of a projection apparatus in which four projection subsystems are positioned surrounding floating display position 700. In embodiments, the four projection subsystems are spaced apart from one another at an angle of approximately 360/x where x equals the number of projection subsystems in the projection system. In embodiments, the four subsystems may each be mounted at a different angular position around the floating display position.

Figure 8:
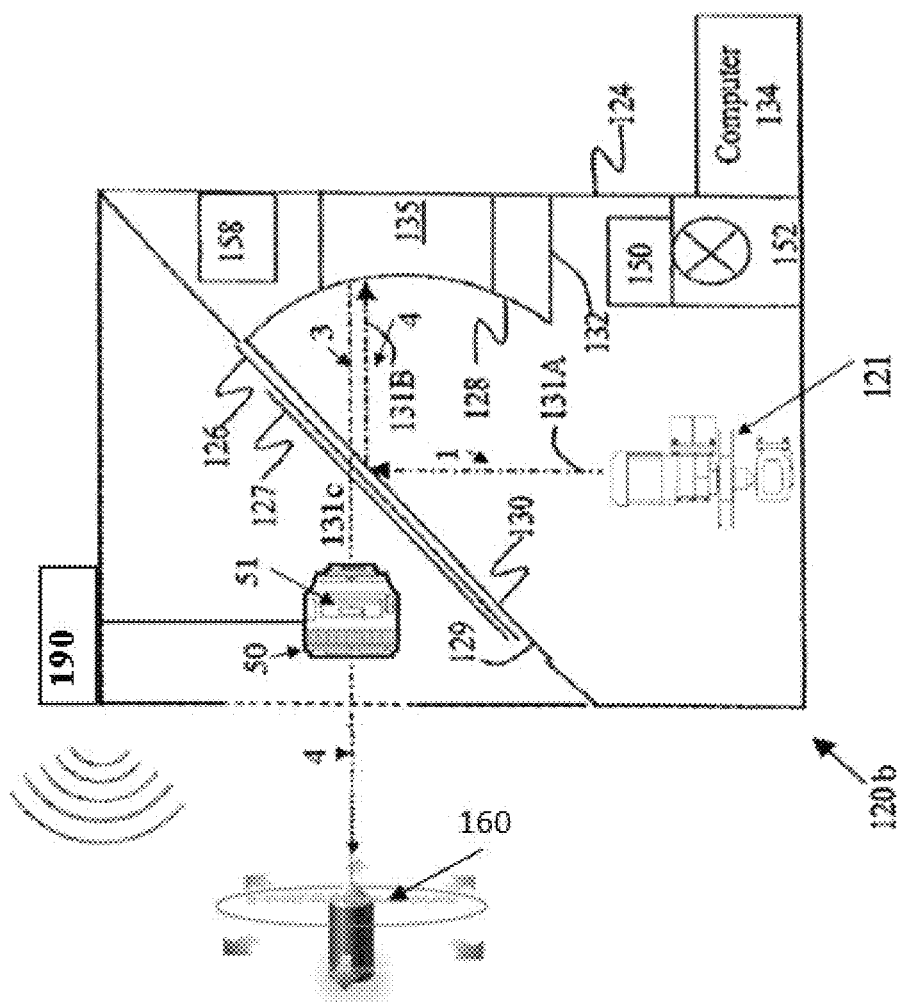
FIG. 8 illustrates a projection apparatus that uses a conical mirror in accordance with another embodiment of the present invention.

A respective projection apparatus, such as one of apparatuses 120, 120*b*, 200, 200' or 200" may be oriented to project images downward as shown in FIG. 8. When oriented downward, a single projection apparatus may direct the images onto a 360° conical mirror 160 that reflects the holographic image upward so that the images can be viewed above conical mirror 160 as full 360° projected three-dimensional holographic images. Conical (cone) mirror 160 may be, for example, a conical mirror available from catalog #1414 of Edmund Optics of Barrington, N.J., USA, or, alternatively, a custom cone mirror may be fabricated. In embodiments, conical mirror 160 may be asymmetrical on its top surface to reflect images to a particular floating display position.

Figure 9:
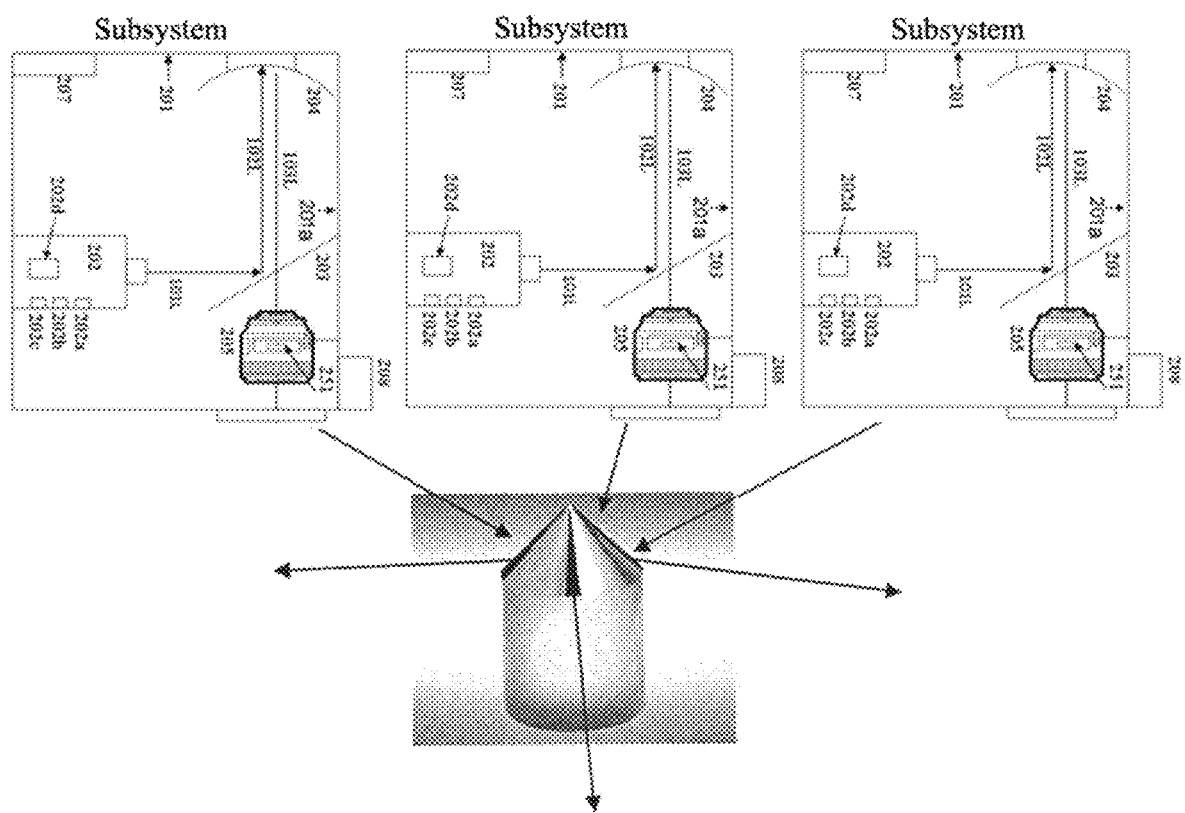
FIG. 9 illustrates a projection apparatus in accordance with another embodiment of the present invention that uses multiple projection apparatuses as subsystems that operate in cooperation with a conical mirror.

FIG. 9 shows another embodiment in which multiple projection apparatuses are implemented as subsystems of a projection apparatus at an elevation above and pointing downward to project images toward a conical mirror that is located below the subsystems. The apparatuses are mounted so that the three-dimensional holographic images are projected downward onto the conical (cone) mirror. As with the conical mirror in FIG. 8, conical mirror 160 in the embodiment of FIG. 9 may be, for example, a conical mirror available from catalog #1414 of Edmund Optics of Barrington, N.J., USA, or, alternatively, a custom cone mirror may be fabricated. Apparatus subsystems are mounted overhead with the images being projected toward conical mirror and reflected from the conical mirror. The viewer can look toward the conical mirror and see the images.

While the embodiments of the present invention described above seek to make more compact projection apparatuses, it is also contemplated that, in embodiments, a projection apparatus, which may be more compact than prior art projection apparatuses, generates relatively large three-dimensional holographic images such as images for one or more objects on the order of several feet (e.g., in the range of 6 feet to 20 feet or more) without very large concave mirrors or a large beam splitter in the projection apparatus. A more compact projection apparatus reduces the cost, size, and weight of the apparatus.

One embodiment of such a device is shown in FIG. 10(*a*). In this embodiment, to achieve maximum brightness, a laser projection system that produces very bright 3D images in full color is used. In this embodiment, the RGB 3P or 6P laser projector from Christie® is particularly useful. Laser projection systems like these systems from Christie® are "pure laser" systems as they employ RGB laser technology that uses individual red, green and blue lasers to generate light and transmit this light from laser light sources (laser module) to remote projection heads at the laser projection system via a fiber optic link. The laser light produced by these projectors may be scalable and may be, for example, 6000 lumens or the light may be scaled up to a brightness of 60,000 lumens or more. In this embodiment, the projection apparatus may be mounted in front of a concave mirror without any housing and without a beam diverter or splitter.

Instead, as shown in FIG. 10(*b*), the images from the laser projection system in this exemplary embodiment are painted by one or more rotating mirrors 300 across the concave mirror and are reflected from concave mirror and projected out to a floating point position for a viewer to see and interact with. Rotating mirrors 300 are generally coupled to a motor (not shown) such as via an axle for rotation. As shown in FIG. 10(*b*), this painting of the images with one or more rotating mirrors permits high drawing rates and the persistence of vision with the ability of an eye to have retention of a visual image for a short period of time after the removal of the stimulus that produced it is the phenomenon that produces the illusion of movement when viewing motion pictures. In embodiments, rotating mirrors may be operated at a spin rate as fast as 15,000 to 20,000 Hz (rotations per second), the image resolution of the image drawn by the rotating mirrors may be about 288 with a view angle of 1.25° and approximately 4320 to 5760 frames/sec.

In another embodiment, the walls of a room may be lined with concave mirrors and a projection apparatus draws images on a respective concave mirror with which it is paired such that the images from one concave mirror are reflected from one concave mirror to another to get a "holodeck" effect as simulated in the Star Trek® television series.

Figure 11:
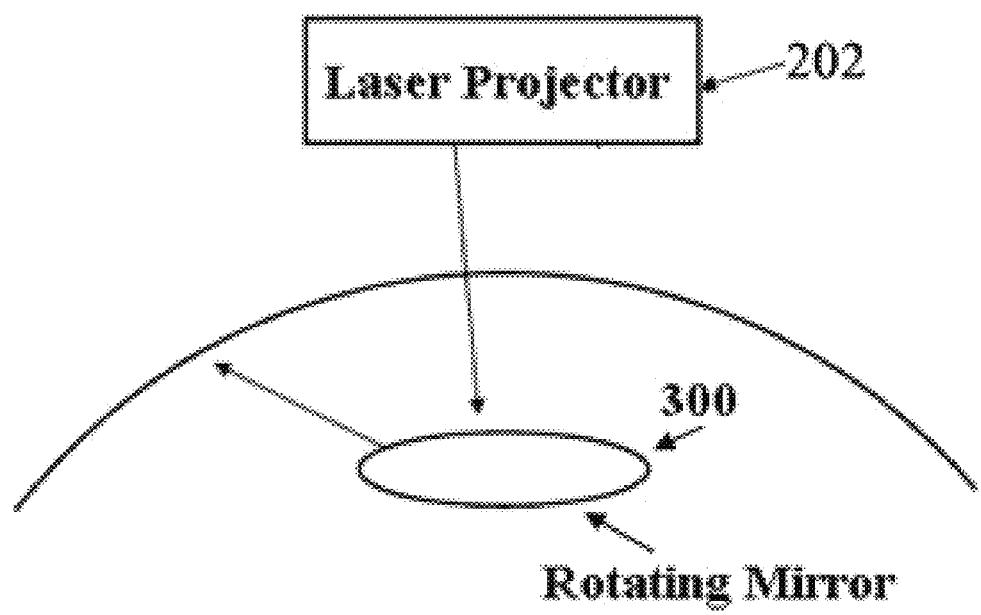
FIG. 11 illustrates a top view of a large projection apparatus in accordance with another embodiment of the present invention in which laser-projected three-dimensional images are drawn onto a concave mirror using rotating mirrors.

Yet another embodiment of the present invention is shown in FIG. 11 where a laser projection system (projector) is mounted in back of the large concave mirror and the laser beam is projected down to the large concave mirror by another rotating mirror that rotates in conjunction with the rotation of the internal rotating mirrors of the projection apparatus. The laser projection system of this embodiment can compensate for any deficiency in the drawing speed of the projection apparatus such that the drawing speed is sufficient to generate a persistent vision to make a floating image at the floating display position.

As a large concave mirror is not only expensive but is also very heavy, a concave mirror in this embodiment (and in the other embodiments) may also be a segmented mirror, which includes an array of smaller mirrors designed to act as segments of a single large curved mirror. The segments can be either spherical or asymmetric (if they are part of a larger parabolic reflector). They are used as objectives for large reflecting telescopes. To function, all the mirror segments have to be polished to a precise shape and actively aligned by a computer-controlled active optics system using actuators built into the mirror support cell. In yet another exemplary embodiment, the concave mirror is comprised of a flexible A1 grade mirror surface that can be applied to a membrane that is in the shape of a concave mirror. Where either a segmented mirror is used or a flexible A1 grade mirror surface is used, the concave mirror will be lightweight and, in embodiments, is foldable for shipping.

Figure 10A:
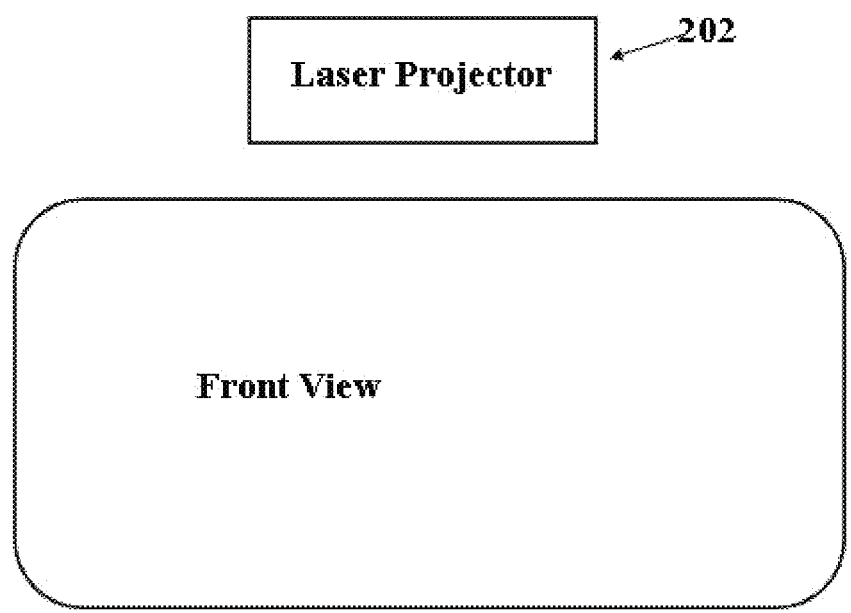
FIG. 10(a) illustrates a front view of a large projection apparatus in which a laser is projected onto a concave mirror in accordance with an embodiment of the present invention.
Figure 10B:
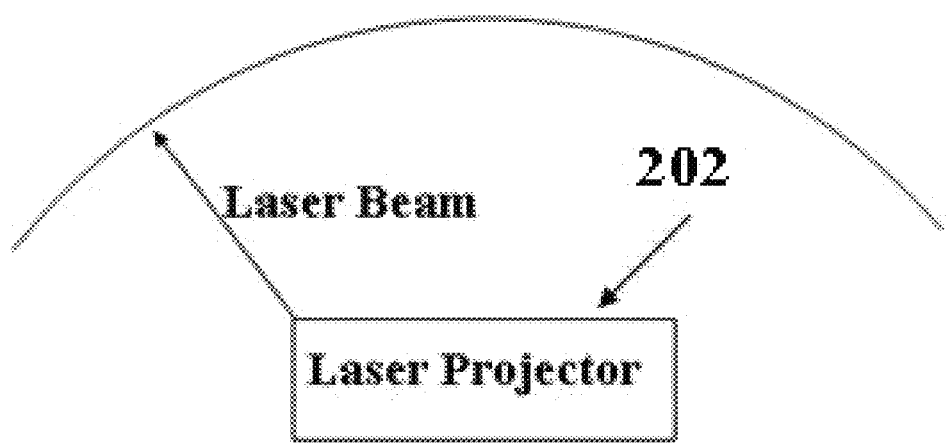
FIG. 10(b) illustrates a top view of the projection apparatus of FIG. 10(a)

In both of the embodiments shown in FIGS. 10(a) and 10(b), the mirror surface of the concave mirror may be applied to a malleable material that can be controlled by a vacuum (not shown), such as a computer-controlled vacuum, or a mechanical subsystem (not shown) to change the concave curvature of the concave mirror on-the-fly to make the image move in relation to the viewer.

In embodiments, such as those described above, an image that is input to laser projection apparatus 202 may be transmitted thereto through a wired or wireless connection. For example, data for three-dimensional holographic images may be input via a USB port, or via another device 198, such as a computer that is internally or externally connected to laser projection apparatus 202, or via a wireless device, such as a phone, tablet, or other laptop, to name a few. Also, in any of the embodiments described above, the projection apparatus may be powered in one or more ways, such as by plugging it into a wall outlet or via batteries, such as rechargeable batteries, to name a few.

The following is a list of a few non-limiting examples of applications in which a projection apparatus that draws large images, such as apparatuses illustrated in FIGS. 10 and 11, would be useful, to name a few:

(1) Gaming Application: Project life-size holographic images of living or dead people with whom one could interact;
(2) Measure Clothing on Viewer: Take image of viewer and project clothing onto the image to test appearance and take measurements;
(3) Casino-Style Gaming at Home;
(4) Auctions: Display images of 3-D objects to be auctioned;
(5) Point of Sale Advertisements or Display System;
(6) 3D Video Conferencing Systems;
(7) Home Entertainment System;
(8) Real Estate Virtual Tours;
(9) Tourism Virtual Tours.
(10) Medical: For example, prior to a patient's surgery, a physician can perform a practice surgery on the holographic image of an MRI of a patient's heart or other organ to avoid problems, or the large holographic images may be used as a visual aid for robotic surgery.

In accordance with an embodiment of the present invention, a projection apparatus for projecting three-dimensional holographic images to a floating display position is described. The projection apparatus includes a housing that has a laser projection system that is configured to project video images using a laser beam. The laser projection system includes (i) one or more video inputs for inputting image data for the three-dimensional holographic images; (ii) a video processor for generating the video images corresponding to the image data input via the one or more video inputs; and (iii) a laser output operatively connected to the video processor and configured to output the laser beam comprising the video images corresponding to the input image data. The housing further includes a beam diverter placed to receive the laser beam that is directed by the laser projection system; a concave mirror placed to receive the laser beam reflected by the beam diverter and to reflect the laser beam back through the beam diverter; a lens or a series of lenses, placed inside of, and spaced away from a wall of, the housing, through which the laser beam that is reflected from the concave mirror is directed and passes to project three-dimensional holographic images to a focal point at the floating display position that is spaced at a distance and/or size from the lens or series of lenses and that is located outside of the housing; and an adjuster for the lens or series of lenses that is configured to adjust the distance between the lens or series of lenses and the floating display position to which the three-dimensional holographic images are projected for display and/or to adjust the size of the three-dimensional holographic images displayed at the floating display position. In embodiments, the lens or one of the series of lenses includes at least one Fresnel lens. Also, in embodiments, an anti-reflective glass is mounted outside of the housing, and the three-dimensional holographic images are projected through the anti-reflective glass to reduce image brightness outside of the housing. Moreover, in embodiments, a position of the concave mirror within the housing is adjustable remotely to adjust the floating display position or size of the projected three-dimensional holographic images.

In embodiments, concave mirror may be made of multiple mirror segments. In embodiments, the concave mirror may comprise a flexible mirror surface that is applied to a membrane, and the projection apparatus further includes a vacuum subsystem or a mechanical subsystem that is activatable to adjust the concave curvature of the mirror.

In accordance with another embodiment of the present invention, a projection apparatus is described for projecting to a floating display position three-dimensional holographic images that are viewable from multiple angles surrounding the three-dimensional holographic images by positioning at least three projection subsystems spaced from one another surrounding the floating display position. The projection apparatus includes (a) a first projection subsystem that has a first housing having (1) a first laser projection system that is configured to project first video images using a first laser beam, and includes (i) one or more video inputs for inputting first image data for the three-dimensional holographic images; (ii) a video processor for generating the first video images corresponding to the first image data input via the one or more video inputs; and (iii) at least one laser output operatively connected to the video processor and configured to output the first laser beam comprising the first video images corresponding to the first input image data. The housing further includes (2) a first beam diverter placed to receive the first laser beam that is directed by the first laser projection system; (3) a first concave mirror placed to receive the first laser beam reflected by the first beam diverter and to reflect the first laser beam back through the first beam diverter; and (4) a first lens or a series of lenses, placed inside of, and spaced away from a first wall of, the first housing, through which the first laser beam that is reflected from the first concave mirror is directed and passes to project three-dimensional holographic images to a focal point at the floating display position that is spaced at a first distance from the first lens or series of lenses and that is located outside of the first housing; and (5) a first adjuster for the first lens or series of lenses that is configured to adjust the first distance between the first lens or series of lenses and the floating display position to which the three-dimensional holographic images are projected for display and/or to adjust the size of the three-dimensional holographic images displayed at the floating display position. The projection apparatus further includes (b) a second projection subsystem that has a second housing having (1) a second laser projection system that is configured to project second video images using a second laser beam. The second laser projection system includes (i) one or more video inputs for inputting second image data for the three-dimensional holographic images; (ii) a video processor for generating the second video images corresponding to the second image data input via the one or more video inputs; and (iii) at least one laser output operatively connected to the video processor and configured to output the second laser beam comprising the second video images corresponding to the second input image data. The housing further includes (2) a second beam diverter placed to receive the second laser beam that is directed by the second laser projection system; (3) a second concave mirror placed to receive the second laser beam reflected by the second beam diverter and to reflect the second laser beam back through the second beam diverter; (4) a second lens or a series of lenses, placed inside of, and spaced away from a second wall of, the second housing, through which the second laser beam that is reflected from the second concave mirror is directed and passes to project three-dimensional holographic images to a focal point at the floating display position that is spaced at a second distance from the second lens or series of lenses and that is located outside of the second housing; and (5) a second adjuster for the second lens or series of lenses that is configured to adjust the second distance between the second lens or series of lenses and the floating display position to which the three-dimensional holographic images are projected for display and/or to adjust the size of the three-dimensional holographic images displayed at the floating display position. The projection apparatus further includes (c) a third projection subsystem includes a third housing having (1) a third laser projection system that is configured to project third video images using a third laser beam. The third laser projection system includes (i) one or more video inputs for inputting third image data for the three-dimensional holographic images; (ii) a video processor for generating the third video images corresponding to the third image data input via the one or more video inputs; and (iii) at least one laser output operatively connected to the video processor and configured to output the third laser beam comprising the video images corresponding to the third input image data. The projection apparatus further includes (2) a third beam diverter placed to receive the third laser beam that is directed by the third laser projection system; (3) a third concave mirror placed to receive the third laser beam reflected by the third beam diverter and to reflect the third laser beam back through the third beam diverter; (4) a third lens or a series of lenses, placed inside of, and spaced away from a third wall of, the third housing, through which the third laser beam that is reflected from the third concave mirror is directed and passes to project three-dimensional holographic images to a focal point at the floating display position that is spaced at a third distance from the third lens or series of lenses and that is located outside of the third housing; and (5) a third adjuster for the third lens or series of lenses that is configured to adjust the third distance between the third lens or series of lenses and the floating display position to which the three-dimensional holographic images are projected for display and/or to adjust the size of the three-dimensional holographic images displayed at the floating display position; (e) one or more mounts to mount each of the first, second and third projection subsystems at a different angular position around the floating display position. In this embodiment, each of the respective projection subsystems is operable to synchronously project the three-dimensional holographic images by the at least three projection subsystems to the floating display position from a perspective that is dependent on the respective angular position of each of the at least three projection subsystems such that the three-dimensional holographic images projected by the at least three projection subsystems overlap at the floating display position and are viewable from multiple positions surrounding the floating display position. In embodiments, the at least three projection subsystems are spaced around the floating display position and are spaced apart from one another at an angle of approximately 360/x where x equals the number of projection subsystems in the projection apparatus.

In embodiments, the projection system further includes (a) a fourth projection subsystem that has a fourth housing including (1) a fourth laser projection system that is configured to project fourth video images using a fourth laser beam. The fourth laser projection system has (i) one or more video inputs for inputting fourth image data for the three-dimensional holographic images; (ii) a video processor for generating the fourth video images corresponding to the fourth image data input via the one or more video inputs; and (iii) at least one laser output operatively connected to the video processor and configured to output the fourth laser beam comprising the fourth video images corresponding to the fourth input image data. The fourth projection subsystem also includes (2) a rotating mirror placed to receive the fourth laser beam that is directed by the fourth laser projection system; (3) a fourth concave mirror placed to receive the fourth laser beam reflected by the rotating mirror and to reflect the fourth laser beam incident on the fourth concave mirror; (4) a fourth lens or a series of lenses, placed inside of, and spaced away from a fourth wall of, the fourth housing, through which the fourth laser beam that is reflected from the fourth concave mirror is directed and passes to project three-dimensional holographic images downward to a focal point at the floating display position that is spaced at a fourth distance from the fourth lens or series of lenses and that is located outside of the fourth housing; and (5) a fourth adjuster for the fourth lens or series of lenses that is configured to adjust the fourth distance between the fourth lens or series of lenses and the floating display position to which the three-dimensional holographic images are projected for display and/or to adjust the size of the three-dimensional holographic images displayed at the floating display position.

In accordance with another embodiment of the present invention, a projection apparatus is described for projecting to a floating display position three-dimensional holographic images that are viewable from multiple angles surrounding the three-dimensional holographic images by positioning at least three projection subsystems spaced from one another surrounding the floating display position. The projection apparatus includes (a) a first projection subsystem that has a first housing having (1) a first laser projection system that is configured to project first video images using a first laser beam, and includes (i) one or more video inputs for inputting first image data for the three-dimensional holographic images; (ii) a video processor for generating the first video images corresponding to the first image data input via the one or more video inputs; and (iii) at least one laser output operatively connected to the video processor and configured to output the first laser beam comprising the first video images corresponding to the first input image data. The housing further includes (2) a first beam diverter placed to receive the first laser beam that is directed by the first laser projection system; (3) a first concave mirror placed to receive the first laser beam reflected by the first beam diverter and to reflect the first laser beam back through the first beam diverter; and (4) a first lens or a series of lenses, placed inside of, and spaced away from a first wall of, the first housing, through which the first laser beam that is reflected from the first concave mirror is directed and passes to project three-dimensional holographic images to a focal point at the floating display position that is spaced at a first distance from the first lens or series of lenses and that is located outside of the first housing; and (5) a first adjuster for the first lens or series of lenses that is configured to adjust the first distance between the first lens or series of lenses and the floating display position to which the three-dimensional holographic images are projected for display and/or to adjust the size of the three-dimensional holographic images displayed at the floating display position. The projection apparatus further includes (b) a second projection subsystem that has a second housing having (1) a second laser projection system that is configured to project second video images using a second laser beam. The second laser projection system includes (i) one or more video inputs for inputting second image data for the three-dimensional holographic images; (ii) a video processor for generating the second video images corresponding to the second image data input via the one or more video inputs; and (iii) at least one laser output operatively connected to the video processor and configured to output the second laser beam comprising the second video images corresponding to the second input image data. The housing further includes (2) a second beam diverter placed to receive the second laser beam that is directed by the second laser projection system; (3) a second concave mirror placed to receive the second laser beam reflected by the second beam diverter and to reflect the second laser beam back through the second beam diverter; (4) a second lens or a series of lenses, placed inside of, and spaced away from a second wall of, the second housing, through which the second laser beam that is reflected from the second concave mirror is directed and passes to project three-dimensional holographic images to a focal point at the floating display position that is spaced at a second distance from the second lens or series of lenses and that is located outside the second housing; and (5) a second adjuster for the second lens or series of lenses that is configured to adjust the second distance between the second lens or series of lenses and the floating display position to which the three-dimensional holographic images are projected for display and/or to adjust the size of the three-dimensional holographic images displayed at the floating display position. The projection apparatus further includes (c) a third projection subsystem includes a third housing having (1) a third laser projection system that is configured to project third video images using a third laser beam. The third laser projection system includes (i) one or more video inputs for inputting third image data for the three-dimensional holographic images; (ii) a video processor for generating the third video images corresponding to the third image data input via the one or more video inputs; and (iii) at least one laser output operatively connected to the video processor and configured to output the third laser beam comprising the video images corresponding to the third input image data. The projection apparatus further includes (2) a third beam diverter placed to receive the third laser beam that is directed by the third laser projection system; (3) a third concave mirror placed to receive the third laser beam reflected by the third beam diverter and to reflect the third laser beam back through the third beam diverter; (4) a third lens or a series of lenses, placed inside of, and spaced away from a third wall of, the third housing, through which the third laser beam that is reflected from the third concave mirror is directed and passes to project three-dimensional holographic images to a focal point at the floating display position that is spaced at a third distance from the third lens or series of lenses and that is located outside of the third housing; and (5) a third adjuster for the third lens or series of lenses that is configured to adjust the third distance between the third lens or series of lenses and the floating display position to which the three-dimensional holographic images are projected for display and/or to adjust the size of the three-dimensional holographic images displayed at the floating display position; (d) one or more mounts to mount each of the first, second and third projection subsystems at a different angular position around the floating display position; and (e) a conical mirror positioned below the first, second and third projection subsystems to receive the respective three-dimensional holographic images projected downward by each of the respective lenses or series of lenses and to reflect the three-dimensional holographic images upward to the floating display position located above the conical mirror to be viewable from multiple positions surrounding the floating display position. In this embodiment, each of the respective projection apparatus subsystems is operable to synchronously project the three-dimensional holographic images by the at least three projection subsystems to the floating display position from a perspective that is dependent on the respective angular position of each of the at least three projection subsystems such that the three-dimensional holographic images projected by the at least three projection subsystems overlap at the floating display position and are viewable from multiple positions surrounding the floating display position. In embodiments, the at least three projection subsystems are spaced around the floating display position and are spaced apart from one another at an angle of approximately 360/x where x equals the number of projection subsystems in the projection system.

In embodiments, the projection system further includes (a) a fourth projection subsystem that has a fourth housing including (1) a fourth laser projection system that is configured to project fourth video images using a fourth laser beam. The fourth laser projection system has (i) one or more video inputs for inputting fourth image data for the three-dimensional holographic images; (ii) a video processor for generating the fourth video images corresponding to the fourth image data input via the one or more video inputs; and (iii) at least one laser output operatively connected to the video processor and configured to output the fourth laser beam comprising the fourth video images corresponding to the fourth input image data. The fourth projection subsystem also includes (2) a rotating mirror placed to receive the fourth laser beam that is directed by the fourth laser projection system; (3) a fourth concave mirror placed to receive the fourth laser beam reflected by the rotating mirror and to reflect the fourth laser beam incident on the fourth concave mirror; (4) a fourth lens or a series of lenses, placed inside of, and spaced away from a fourth wall of, the fourth housing, through which the fourth laser beam that is reflected from the fourth concave mirror is directed and passes to project three-dimensional holographic images downward to a focal point at the floating display position that is spaced at a fourth distance from the fourth lens or series of lenses and that is located outside of the fourth housing; and (5) a fourth adjuster for the fourth lens or series of lenses that is configured to adjust the fourth distance between the fourth lens or series of lenses and the floating display position to which the three-dimensional holographic images are projected for display and/or to adjust the size of the three-dimensional holographic images displayed at the floating display position.

As an alternative to a beam diverter, rotating mirrors may be included in projection apparatus for drawing images from a projection apparatus onto the concave mirror. Thus, in accordance with an embodiment of the present invention, a projection apparatus for projecting three-dimensional holographic images to a floating display position is described. The projection apparatus includes a housing that has a laser projection system that is configured to project video images using a laser beam. The laser projection system includes (i) one or more video inputs for inputting image data for the three-dimensional holographic images; (ii) a video processor for generating the video images corresponding to the image data input via the one or more video inputs; and (iii) a laser output operatively connected to the video processor and configured to output the laser beam comprising the video images corresponding to the input image data. The housing further includes a rotating mirror placed to receive the laser beam that is directed by the laser projection system; a concave mirror placed to receive the laser beam reflected by the rotating mirror and to reflect the laser beam incident on the concave mirror; a lens or a series of lenses, placed inside of, and spaced away from a wall of, the housing, through which the laser beam that is reflected from the concave mirror is directed and passes to project three-dimensional holographic images to a focal point at the floating display position that is spaced at a distance from the lens or series of lenses and that is located outside of the housing; and an adjuster for the lens or series of lenses that is configured to adjust the distance between the lens or series of lenses and the floating display position to which the three-dimensional holographic images are projected for display and/or to adjust the size of the three-dimensional holographic images displayed at the floating display position. In embodiments, the lens or one of the series of lenses includes at least one Fresnel lens. Also, in embodiments, an anti-reflective glass is mounted outside of the housing, and the three-dimensional holographic images are projected through the anti-reflective glass to reduce image brightness outside of the housing. Moreover, in embodiments, a position of the concave mirror within the housing is adjustable remotely to adjust the floating display position or size of the projected three-dimensional holographic images.

In embodiments, a concave mirror may be made of multiple mirror segments. In embodiments, the concave mirror may comprise a flexible mirror surface that is applied to a membrane, and the projection apparatus further includes a vacuum subsystem or a mechanical subsystem that is activatable to adjust the curvature of the mirror.

In accordance with another embodiment of the present invention, a projection apparatus is described for projecting to a floating display position three-dimensional holographic images that are viewable from multiple angles surrounding the three-dimensional holographic images by positioning at least three projection subsystems spaced from one another surrounding the floating display position. The projection apparatus includes (a) a first projection subsystem that has a first housing having (1) a first laser projection system that is configured to project first video images using a first laser beam, and includes (i) one or more video inputs for inputting first image data for the three-dimensional holographic images; (ii) a video processor for generating the first video images corresponding to the first image data input via the one or more video inputs; and (iii) at least one laser output operatively connected to the video processor and configured to output the first laser beam comprising the first video images corresponding to the first input image data. The housing further includes (2) a first rotating mirror placed to receive the first laser beam that is directed by the first laser projection system; (3) a first concave mirror placed to receive the first laser beam reflected by the first rotating mirror and to reflect the first laser beam incident on the concave mirror; and (4) a first lens or a series of lenses, placed inside of, and spaced away from a first wall of, the first housing, through which the first laser beam that is reflected from the first concave mirror is directed and passes to project three-dimensional holographic images to a focal point at the floating display position that is spaced at a first distance from the first lens or series of lenses and that is located outside of the first housing; and (5) a first adjuster for the first lens or series of lenses that is configured to adjust the first distance between the first lens or series of lenses and the floating display position to which the three-dimensional holographic images are projected for display and/or to adjust the size of the three-dimensional holographic images displayed at the floating display position. The projection apparatus further includes (b) a second projection subsystem that has a second housing having (1) a second laser projection system that is configured to project second video images using a second laser beam. The second laser projection system includes (i) one or more video inputs for inputting second image data for the three-dimensional holographic images; (ii) a video processor for generating the second video images corresponding to the second image data input via the one or more video inputs; and (iii) at least one laser output operatively connected to the video processor and configured to output the second laser beam comprising the second video images corresponding to the second input image data. The housing further includes (2) a second rotating mirror placed to receive the second laser beam that is directed by the second laser projection system; (3) a second concave mirror placed to receive the second laser beam reflected by the second rotating mirror and to reflect the second laser beam incident on the concave mirror; (4) a second lens or a series of lenses, placed inside of, and spaced away from a second wall of, the second housing, through which the second laser beam that is reflected from the second concave mirror is directed and passes to project three-dimensional holographic images to a focal point at the floating display position that is spaced at a second distance from the second lens or series of lenses and that is located outside of the second housing; and (5) a second adjuster for the second lens or series of lenses that is configured to adjust the second distance between the second lens or series of lenses and the floating display position to which the three-dimensional holographic images are projected for display and/or to adjust the size of the three-dimensional holographic images displayed at the floating display position. The projection apparatus further includes (c) a third projection subsystem includes a third housing having (1) a third laser projection system that is configured to project third video images using a third laser beam. The third laser projection system includes (i) one or more video inputs for inputting third image data for the three-dimensional holographic images; (ii) a video processor for generating the third video images corresponding to the third image data input via the one or more video inputs; and (iii) at least one laser output operatively connected to the video processor and configured to output the third laser beam comprising the video images corresponding to the third input image data. The projection apparatus further includes (2) a third rotating mirror placed to receive the third laser beam that is directed by the third laser projection system; (3) a third concave mirror placed to receive the third laser beam reflected by the third rotating mirror and to reflect the third laser beam incident on the concave mirror; (4) a third lens or a series of lenses, placed inside of, and spaced away from a third wall of, the third housing, through which the third laser beam that is reflected from the third concave mirror is directed and passes to project three-dimensional holographic images to a focal point at the floating display position that is spaced at a third distance from the third lens or series of lenses and that is located outside of the third housing; and (5) a third adjuster for the third lens or series of lenses that is configured to adjust the third distance between the third lens or series of lenses and the floating display position to which the three-dimensional holographic images are projected for display and/or to adjust the size of the three-dimensional holographic images displayed at the floating display position; (e) one or more mounts to mount each of the first, second and third projection subsystems at a different angular position around the floating display position. In this embodiment, each of the respective projection subsystems is operable to synchronously project the three-dimensional holographic images by the at least three projection subsystems to the floating display position from a perspective that is dependent on the respective angular position of each of the at least three projection subsystems such that the three-dimensional holographic images projected by the at least three projection subsystems overlap at the floating display position and are viewable from multiple positions surrounding the floating display position. In embodiments, the at least three projection subsystems are spaced around the floating display position and are spaced apart from one another at an angle of approximately 360/x where x equals the number of projection subsystems in the projection apparatus.

In embodiments, the projection system further includes (a) a fourth projection subsystem that has a fourth housing including (1) a fourth laser projection system that is configured to project fourth video images using a fourth laser beam. The fourth laser projection system has (i) one or more video inputs for inputting fourth image data for the three-dimensional holographic images; (ii) a video processor for generating the fourth video images corresponding to the fourth image data input via the one or more video inputs; and (iii) at least one laser output operatively connected to the video processor and configured to output the fourth laser beam comprising the fourth video images corresponding to the fourth input image data. The fourth projection subsystem also includes (2) a rotating mirror placed to receive the fourth laser beam that is directed by the fourth laser projection system; (3) a fourth concave mirror placed to receive the fourth laser beam reflected by the rotating mirror and to reflect the fourth laser beam incident on the fourth concave mirror; (4) a fourth lens or a series of lenses, placed inside of, and spaced away from a fourth wall of, the fourth housing, through which the fourth laser beam that is reflected from the fourth concave mirror is directed and passes to project three-dimensional holographic images downward to a focal point at the floating display position that is spaced at a fourth distance from the fourth lens or series of lenses and that is located outside of the fourth housing; and (5) a fourth adjuster for the fourth lens or series of lenses that is configured to adjust the fourth distance between the fourth lens or series of lenses and the floating display position to which the three-dimensional holographic images are projected for display and/or to adjust the size of the three-dimensional holographic images displayed at the floating display position.

In accordance with another embodiment of the present invention, a projection apparatus is described for projecting to a floating display position three-dimensional holographic images that are viewable from multiple angles surrounding the three-dimensional holographic images by positioning at least three projection subsystems spaced from one another surrounding the floating display position. The projection apparatus includes (a) a first projection subsystem that has a first housing having (1) a first laser projection system that is configured to project first video images using a first laser beam, and includes (i) one or more video inputs for inputting first image data for the three-dimensional holographic images; (ii) a video processor for generating the first video images corresponding to the first image data input via the one or more video inputs; and (iii) at least one laser output operatively connected to the video processor and configured to output the first laser beam comprising the first video images corresponding to the first input image data. The housing further includes (2) a first rotating mirror placed to receive the first laser beam that is directed by the first laser projection system; (3) a first concave mirror placed to receive the first laser beam reflected by the first rotating mirror and to reflect the first laser beam incident on the concave mirror; and (4) a first lens or a series of lenses, placed inside of, and spaced away from a first wall of, the first housing, through which the first laser beam that is reflected from the first concave mirror is directed and passes to project three-dimensional holographic images to a focal point at the floating display position that is spaced at a first distance from the first lens or series of lenses and that is located outside of the first housing; and (5) a first adjuster for the first lens or series of lenses that is configured to adjust the first distance between the first lens or series of lenses and the floating display position to which the three-dimensional holographic images are projected for display and/or to adjust the size of the three-dimensional holographic images displayed at the floating display position. The projection apparatus further includes (b) a second projection subsystem that has a second housing having (1) a second laser projection system that is configured to project second video images using a second laser beam. The second laser projection system includes (i) one or more video inputs for inputting second image data for the three-dimensional holographic images; (ii) a video processor for generating the second video images corresponding to the second image data input via the one or more video inputs; and (iii) at least one laser output operatively connected to the video processor and configured to output the second laser beam comprising the second video images corresponding to the second input image data. The housing further includes (2) a second rotating mirror placed to receive the second laser beam that is directed by the second laser projection system; (3) a second concave mirror placed to receive the second laser beam reflected by the second rotating mirror and to reflect the second laser beam incident on the concave mirror; (4) a second lens or a series of lenses, placed inside of, and spaced away from a second wall of, the second housing, through which the second laser beam that is reflected from the second concave mirror is directed and passes to project three-dimensional holographic images to a focal point at the floating display position that is spaced at a second distance from the second lens or series of lenses and that is located outside of the second housing; and (5) a second adjuster for the second lens or series of lenses that is configured to adjust the second distance between the second lens or series of lenses and the floating display position to which the three-dimensional holographic images are projected for display and/or to adjust the size of the three-dimensional holographic images displayed at the floating display position. The projection apparatus further includes (c) a third projection subsystem includes a third housing having (1) a third laser projection system that is configured to project third video images using a third laser beam. The third laser projection system includes (i) one or more video inputs for inputting third image data for the three-dimensional holographic images; (ii) a video processor for generating the third video images corresponding to the third image data input via the one or more video inputs; and (iii) at least one laser output operatively connected to the video processor and configured to output the third laser beam comprising the video images corresponding to the third input image data. The projection apparatus further includes (2) a third rotating mirror placed to receive the third laser beam that is directed by the third laser projection system; (3) a third concave mirror placed to receive the third laser beam reflected by the third rotating mirror and to reflect the third laser beam incident on the concave mirror; (4) a third lens or a series of lenses, placed inside of, and spaced away from a third wall of, the third housing, through which the third laser beam that is reflected from the third concave mirror is directed and passes to project three-dimensional holographic images to a focal point at the floating display position that is spaced at a third distance from the third lens or series of lenses and that is located outside of the third housing; and (5) a third adjuster for the third lens or series of lenses that is configured to adjust the third distance between the third lens or series of lenses and the floating display position to which the three-dimensional holographic images are projected for display and/or to adjust the size of the three-dimensional holographic images displayed at the floating display position; (d) one or more mounts to mount each of the first, second and third projection subsystems at a different angular position around the floating display position; and (e) a conical mirror positioned below the first, second and third projection subsystems to receive the respective three-dimensional holographic images projected downward by each of the respective lenses or series of lenses and to reflect the three-dimensional holographic images upward to the floating display position located above the conical mirror to be viewable from multiple positions surrounding the floating display position. In this embodiment, each of the respective projection apparatus subsystems is operable to synchronously project the three-dimensional holographic images by the at least three projection subsystems to the floating display position from a perspective that is dependent on the respective angular position of each of the at least three projection subsystems such that the three-dimensional holographic images projected by the at least three projection subsystems overlap at the floating display position and are viewable from multiple positions surrounding the floating display position. In embodiments, the at least three projection subsystems are spaced around the floating display position and are spaced apart from one another at an angle of approximately 360/x where x equals the number of projection subsystems in the projection system.

In embodiments, the projection system further includes (a) a fourth projection subsystem that has a fourth housing including (1) a fourth laser projection system that is configured to project fourth video images using a fourth laser beam. The fourth laser projection system has (i) one or more video inputs for inputting fourth image data for the three-dimensional holographic images; (ii) a video processor for generating the fourth video images corresponding to the fourth image data input via the one or more video inputs; and (iii) at least one laser output operatively connected to the video processor and configured to output the fourth laser beam comprising the fourth video images corresponding to the fourth input image data. The fourth projection subsystem also includes (2) a rotating mirror placed to receive the fourth laser beam that is directed by the fourth laser projection system; (3) a fourth concave mirror placed to receive the fourth laser beam reflected by the rotating mirror and to reflect the fourth laser beam incident on the fourth concave mirror; (4) a fourth lens or a series of lenses, placed inside of, and spaced away from a fourth wall of, the fourth housing, through which the fourth laser beam that is reflected from the fourth concave mirror is directed and passes to project three-dimensional holographic images downward to a focal point at the floating display position that is spaced at a fourth distance from the fourth lens or series of lenses and that is located outside of the fourth housing; and (5) a fourth adjuster for the fourth lens or series of lenses that is configured to adjust the fourth distance between the fourth lens or series of lenses and the floating display position to which the three-dimensional holographic images are projected for display and/or to adjust the size of the three-dimensional holographic images displayed at the floating display position.

Now that embodiments of the present invention have been shown and described in detail, various modifications and improvements thereon will become readily apparent to those skilled in the art. Accordingly, the spirit and scope of the present invention is to be construed broadly and not limited by the foregoing specification.

What is claimed is:

1. A projection apparatus for projecting three-dimensional holographic images to a floating display position, the projection apparatus having a housing comprising:
 (1) a laser projection system that is configured to project video images using a laser beam, wherein the laser projection system comprises:
  (i) one or more video inputs for inputting image data for the three-dimensional holographic images;
  (ii) a video processor for generating the video images corresponding to the image data input via the one or more video inputs; and (iii) a laser output operatively connected to the video processor and configured to output the laser beam comprising the video images corresponding to the input image data;

(2) a diffuser to diffuse the laser beam that is output from the laser projection system;

(3) a beam diverter placed to receive the laser beam that is directed by the laser projection system after the laser beam is diffused by the diffuser;

(4) a concave mirror placed to receive the laser beam reflected by the beam diverter and to reflect the laser beam back through the beam diverter to project three-dimensional holographic images to a focal point at the floating display position that is spaced a distance from the housing; and (5) an ultrasonic pressure system configured to detect whether a user's hand is positioned within a respective three-dimensional holographic image and to emit an ultrasonic pulse in the direction of the user's hand when the user's hand is positioned within the three-dimensional holographic image, wherein the ultrasonic pulse is felt by the user's hand.

2. The projection apparatus of claim 1, further comprising:

(6) a lens, placed inside of, and spaced away from a wall of, the housing, through which the laser beam that is reflected from the concave mirror is directed and passes to the floating display position that is located outside of the housing;

(7) an adjuster for the lens that is configured to adjust the distance between the lens and the floating display position to which the three-dimensional holographic images are projected for display and/or to adjust the size of the three-dimensional holographic images displayed at the floating display position.

3. The projection apparatus of claim 2, wherein the lens is one of a series of lenses.

4. The projection apparatus of claim 1, further comprising an anti-reflective glass, mounted outside of the housing, through which the three-dimensional holographic images are projected to reduce image brightness.

5. The projection apparatus of claim 1, wherein a position of the concave mirror within the housing is adjustable remotely to adjust the floating display position or size of the projected three-dimensional holographic images.

6. The projection apparatus of claim 1, wherein the concave mirror comprises multiple mirror segments.

7. The projection apparatus of claim 1, wherein the concave mirror comprises a flexible mirror surface applied to a membrane, and wherein the projection apparatus further comprises a vacuum subsystem or a mechanical subsystem that is activatable to adjust the concave curvature of the mirror.

8. The projection apparatus of claim 1, wherein the diffuser comprises a translucent material and is located such that the laser beam from the laser projection system passes through the diffuser before being received at the beam diverter.

9. The projection apparatus of claim 1, wherein the diffuser comprises a reflective material and is located such that the laser beam that is output from the laser projection system is reflected by the diffuser back toward the beam diverter.

10. A projection apparatus for projecting to a floating display position three-dimensional holographic images that are viewable from multiple angles surrounding the three-dimensional holographic images by positioning at least three projection subsystems spaced from one another surrounding the floating display position, the projection apparatus comprising:

(a) a first projection subsystem having a first housing comprising:

(1) a first laser projection system that is configured to project first video images using a first laser beam, wherein the first laser projection system comprises:

(i) a first set of one or more video inputs for inputting first image data for the three-dimensional holographic images;

(ii) a first video processor for generating the first video images corresponding to the first image data input via the first set of one or more video inputs; and (iii) at least one laser output operatively connected to the video processor and configured to output the first laser beam comprising the first video images corresponding to the first input image data;

(2) a first diffuser to diffuse the first laser beam that is output from the first laser projection system;

(3) a first beam diverter placed to receive the first laser beam that is directed by the first laser projection system after the first laser beam is diffused by the first diffuser; and (4) a first concave mirror placed to receive the first laser beam reflected by the first beam diverter and to reflect the first laser beam back through the first beam diverter;

(b) a second projection subsystem having a second housing comprising:

(1) a second laser projection system that is configured to project second video images using a second laser beam, wherein the second laser projection system comprises:

(i) a second set of one or more video inputs for inputting second image data for the three-dimensional holographic images;

(ii) a second video processor for generating the second video images corresponding to the second image data input via the second set of one or more video inputs; and (iii) at least one laser output operatively connected to the second video processor and configured to output the second laser beam comprising the second video images corresponding to the second input image data;

(2) a second diffuser to diffuse the second laser beam that is output from the second laser projection system;

(3) a second beam diverter placed to receive the second laser beam that is directed by the second laser projection system after the second laser beam is diffused by the second diffuser; and (4) a second concave mirror placed to receive the second laser beam reflected by the second beam diverter and to reflect the second laser beam back through the second beam diverter;

(c) a third projection subsystem having a third housing comprising:

(1) a third laser projection system that is configured to project third video images using a third laser beam, wherein the third laser projection system comprises:

(i) a third set of one or more video inputs for inputting third image data for the three-dimensional holographic images;

(ii) a third video processor for generating the third video images corresponding to the third image data input via the third set of one or more video inputs; and (iii) at least one laser output operatively connected to the third video processor and configured to output the third laser beam comprising the video images corresponding to the third input image data;

(2) a third diffuser to diffuse the third laser beam that is output from the third laser projection system;

(3) a third beam diverter placed to receive the third laser beam that is directed by the third laser projection system after the third laser beam is diffused by the third diffuser; and (4) a third concave mirror placed to receive the third laser beam reflected by the third beam diverter and to reflect the third laser beam back through the third beam diverter; and (d) one or more mounts to mount each of the first, second and third projection subsystems at a different angular position around the floating display position;

wherein each of the respective projection subsystems is operable to synchronously project the three-dimensional holographic images by the at least three projection subsystems to the floating display position from a perspective that is dependent on the respective angular position of each of the at least three projection subsystems such that the three-dimensional holographic images projected by the at least three projection subsystems overlap at the floating display position and are viewable from multiple positions surrounding the floating display position.

11. The projection apparatus of claim 10, wherein the first diffuser comprises a translucent material and is located such that the first laser beam from the first laser projection system passes through the first diffuser before being received at the first beam diverter.

12. The projection apparatus of claim 10, wherein the first diffuser comprises a reflective material and is located such that the first laser beam that is output from the first laser projection system is reflected by the first diffuser back toward the first beam diverter.

13. The projection apparatus of claim 10, wherein the first projection subsystem further comprises:

(5) a lens or a series of lenses, placed inside of, and spaced away from a first wall of, the first housing, through which the first laser beam that is reflected from the first concave mirror is directed and passes to project three-dimensional holographic images to a focal point at the floating display position that is spaced at a first distance from the lens or series of lenses and that is located outside of the first housing; and (6) an adjuster for the lens or series of lenses that is configured to adjust the first distance between the lens or series of lenses and the floating display position to which the three-dimensional holographic images are projected for display and/or to adjust the size of the three-dimensional holographic images displayed at the floating display position.

14. The projection apparatus of claim 10, wherein the at least three projection subsystems are spaced around the floating display position and are spaced apart from one another at an angle of approximately 360/x where x equals the number of projection subsystems in the projection apparatus.

15. The projection apparatus of claim 10, further comprising:

(a) a fourth projection subsystem having a fourth housing comprising:

(1) a fourth laser projection system that is configured to project fourth video images using a fourth laser beam, wherein the fourth laser projection system comprises:

(i) a fourth set of one or more video inputs for inputting fourth image data for the three-dimensional holographic images;

(ii) a fourth video processor for generating the fourth video images corresponding to the fourth image data input via the fourth set of one or more video inputs; and (iii) at least one laser output operatively connected to the fourth video processor and configured to output the fourth laser beam comprising the fourth video images corresponding to the fourth input image data;

(2) a rotating mirror placed to receive the fourth laser beam that is directed by the fourth laser projection system;

(3) a fourth concave mirror placed to receive the fourth laser beam reflected by the rotating mirror and to reflect the fourth laser beam incident on the fourth concave mirror;

(4) a lens or a series of lenses, placed inside of, and spaced away from a fourth wall of, the fourth housing, through which the fourth laser beam that is reflected from the fourth concave mirror is directed and passes to project three-dimensional holographic images downward to a focal point at the floating display position that is spaced at a fourth distance from the lens or series of lenses and that is located outside of the fourth housing; and (5) an adjuster for the lens or series of lenses that is configured to adjust the fourth distance between the lens or series of lenses and the floating display position to which the three-dimensional holographic images are projected for display and/or to adjust the size of the three-dimensional holographic images displayed at the floating display position.

16. A projection apparatus for projecting to a floating display position three-dimensional holographic images that are viewable from multiple angles surrounding the three-dimensional holographic images by positioning at least three projection subsystems spaced from one another surrounding the floating display position, the projection apparatus comprising:

(a) a first projection subsystem having a first housing comprising:

(1) a first laser projection system that is configured to project first video images using a first laser beam, wherein the first laser projection system comprises:

(i) a first set of one or more video inputs for inputting first image data for the three-dimensional holographic images;

(ii) a first video processor for generating the first video images corresponding to the first image data input via the first set of one or more video inputs; and (iii) at least one laser output operatively connected to the first video processor and configured to output the first laser beam comprising the first video images corresponding to the first input image data;

(2) a first diffuser to diffuse the first laser beam that is output from the first laser projection system;

(3) a first beam diverter placed to receive the first laser beam that is directed by the first laser projection system after the first laser beam is diffused by the first diffuser;

(4) a first concave mirror placed to receive the first laser beam reflected by the first beam diverter and to reflect the first laser beam back through the first beam diverter and projected downward to a focal point located outside of the first housing;

(b) a second projection subsystem having a second housing comprising:

(1) a second laser projection system that is configured to project second video images using a second laser beam, wherein the second laser projection system comprises:

(i) a second set of one or more video inputs for inputting second image data for the three-dimensional holographic images;

(ii) a second video processor for generating the second video images corresponding to the second image data input via the second set of one or more video inputs; and (iii) at least one laser output operatively connected to the second video processor and configured to output the second laser beam comprising the second video images corresponding to the second input image data;

(2) a second diffuser to diffuse the second laser beam that is output from the second laser projection system;

(3) a second beam diverter placed to receive the second laser beam that is directed by the second laser projection system after the second laser beam is diffused by the second diffuser; and (4) a second concave mirror placed to receive the second laser beam reflected by the second beam diverter and to reflect the second laser beam back through the second beam diverter and projected downward to the focal point;

(c) a third projection subsystem having a third housing comprising:

(1) a third laser projection system that is configured to project third video images using a third laser beam, wherein the third laser projection system comprises:

(i) a third set of one or more video inputs for inputting third image data for the three-dimensional holographic images;

(ii) a third video processor for generating the third video images corresponding to the third image data input via the third set of one or more video inputs; and (iii) at least one laser output operatively connected to the third video processor and configured to output the third laser beam comprising the video images corresponding to the third input image data;

(2) a third diffuser to diffuse the third laser beam that is output from the third laser projection system;

(3) a third beam diverter placed to receive the third laser beam that is directed by the third laser projection system after the third laser beam is diffused by the third diffuser; and (4) a third concave mirror placed to receive the third laser beam reflected by the third beam diverter and to reflect the third laser beam back through the third beam diverter and projected downward to the focal point;

(d) one or more mounts to mount each of the first, second and third projection subsystems at a different angular position around the floating display position; and (e) a conical mirror positioned below the first, second and third projection subsystems to receive the respective three-dimensional holographic images projected downward to the focal point by each of the first, second and third projection subsystems and to reflect the three-dimensional holographic images upward to the floating display position located above the conical mirror to be viewable from multiple positions surrounding the floating display position;

wherein each of the respective projection apparatus subsystems is operable to synchronously project the three-dimensional holographic images by the at least three projection subsystems to the floating display position from a perspective that is dependent on the respective angular position of each of the at least three projection subsystems such that the three-dimensional holographic images projected by the at least three projection subsystems overlap at the floating display position and are viewable from multiple positions surrounding the floating display position.

17. The projection apparatus of claim 16, wherein the at least three projection subsystems are spaced around the floating display position and are spaced apart from one another at an angle of approximately 360/x where x equals the number of projection subsystems in the projection system.

18. The projection apparatus of claim 16, further comprising:

(a) a fourth projection subsystem having a fourth housing comprising:

(1) a fourth laser projection system that is configured to project fourth video images using a fourth laser beam, wherein the fourth laser projection system comprises:

(i) a fourth set of one or more video inputs for inputting fourth image data for the three-dimensional holographic images;

(ii) a fourth video processor for generating the fourth video images corresponding to the fourth image data input via the fourth set of one or more video inputs; and (iii) at least one laser output operatively connected to the fourth video processor and configured to output the fourth laser beam comprising the fourth video images corresponding to the fourth input image data;

(2) a rotating mirror placed to receive the fourth laser beam that is directed by the fourth laser projection system;

(3) a fourth concave mirror placed to receive the fourth laser beam reflected by the rotating mirror and to reflect the fourth laser beam incident on the fourth concave mirror;

(4) a lens or a series of lenses, placed inside of, and spaced away from a fourth wall of, the fourth housing, through which the fourth laser beam that is reflected from the fourth concave mirror is directed and passes to project three-dimensional holographic images downward to the focal point that is spaced at a distance from the lens or series of lenses and that is located outside of the fourth housing; and (5) an adjuster for the lens or series of lenses that is configured to adjust the distance between the lens or series of lenses and the floating display position to which the three-dimensional holographic images are projected for display and/or to adjust the size of the three-dimensional holographic images displayed at the floating display position.

19. The projection apparatus of claim 16, wherein the first diffuser comprises a translucent material and is located such that the first laser beam from the first laser projection system passes through the first diffuser before being received at the first beam diverter.

20. The projection apparatus of claim 16, wherein the diffuser comprises a reflective material and is located such that the first laser beam that is output from the first laser projection system is reflected by the first diffuser back toward the first beam diverter.

* * * * *